US010362047B2

(12) United States Patent
Lowry et al.

(10) Patent No.: US 10,362,047 B2
(45) Date of Patent: Jul. 23, 2019

(54) SYSTEMS AND METHODS FOR PROVIDING USER INTERFACES BASED ON ACTIONS ASSOCIATED WITH UNTRUSTED EMAILS

(71) Applicant: KnowBe4, Inc., Clearwater, FL (US)

(72) Inventors: Bret Lowry, Largo, FL (US); Gauvin Repuspolo, San Pedro (PH); Greg Kras, Dunedin, FL (US)

(73) Assignee: KNOWBE4, INC., Clearwater, FL (US)

( * ) Notice: Subject to any disclaimer, the term of this patent is extended or adjusted under 35 U.S.C. 154(b) by 0 days.

(21) Appl. No.: 15/972,937

(22) Filed: May 7, 2018

(65) Prior Publication Data

US 2018/0324201 A1  Nov. 8, 2018

Related U.S. Application Data

(60) Provisional application No. 62/503,212, filed on May 8, 2017, provisional application No. 62/539,204, filed on Jul. 31, 2017, provisional application No. 62/653,862, filed on Apr. 6, 2018.

(51) Int. Cl.
*G06F 11/00* (2006.01)
*H04L 29/06* (2006.01)
*H04L 12/58* (2006.01)
*G06F 21/56* (2013.01)

(52) U.S. Cl.
CPC .......... *H04L 63/1425* (2013.01); *G06F 21/56* (2013.01); *H04L 51/12* (2013.01); *H04L 63/1441* (2013.01); *H04L 63/1483* (2013.01); *G06F 2221/2119* (2013.01)

(58) Field of Classification Search
USPC ............................. 726/22–25; 713/188, 189
See application file for complete search history.

(56) References Cited

U.S. PATENT DOCUMENTS 8,204,480 B1 * 6/2012 Lindteigen ............ H04L 63/083
                                            455/411
8,270,963 B1 * 9/2012 Hart ......................... G06F 8/65
                                            455/418
8,615,807 B1   12/2013 Higbee et al.
(Continued)

FOREIGN PATENT DOCUMENTS

WO   WO-2016/164844 A1   10/2016

OTHER PUBLICATIONS

International Search Report and Written Opinion for PCT/US2018/031385, dated Aug. 27, 2018.

*Primary Examiner* — Amare F Tabor
(74) *Attorney, Agent, or Firm* — Christopher J. McKenna; Foley & Lardner LLP

(57) ABSTRACT

The present disclosure describes a system that notifies users regarding specific user decisions with respect to solution phishing emails. The system notifies users when users perform specific actions with respect to the untrusted phishing emails. The system pauses execution of these actions and prompts the user to confirm whether to take the actions or to revert back to review the actions. In contrast from anti-ransomware technologies which are entirely in control, the system gives the user autonomy in deciding actions relating to untrusted phishing emails. The system interrupts execution of actions related to untrusted phishing emails in order to give users a choice on whether to proceed with actions.

24 Claims, 27 Drawing Sheets

(56) References Cited

U.S. PATENT DOCUMENTS

| | | |
|---|---|---|
| 8,635,703 B1 | 1/2014 | Belani et al. |
| 8,694,659 B1 * | 4/2014 | Stahl .................. H04L 61/6009 |
| | | 380/200 |
| 8,707,417 B1 * | 4/2014 | Liang .................. G06F 9/45558 |
| | | 726/11 |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,674,221 B1 | 6/2017 | Higbee et al. |
| 2009/0031033 A1 * | 1/2009 | Deng .................... H04L 63/126 |
| | | 709/229 |
| 2009/0077383 A1 | 3/2009 | De Monseignat et al. |
| 2009/0164472 A1 | 6/2009 | Huang et al. |
| 2016/0164898 A1 | 6/2016 | Belani et al. |
| 2016/0248795 A1 | 8/2016 | Chien |
| 2016/0301705 A1 | 10/2016 | Higbee et al. |

\* cited by examiner

*360*

Monitor library detects an action of a user with respect to an email to access a domain that is not identified as trusted
360

Responsive to detecting the user action, the monitor library pauses the user's URL request to access the domain
362

The monitor library notifies the user console of the user's URL access request
364

The monitor library receives user input from the user console
366

Responsive to receiving the user input, the monitor library either unpauses the URL request or discards it
368

*Fig. 3B*

SYSTEMS AND METHODS FOR PROVIDING USER INTERFACES BASED ON ACTIONS ASSOCIATED WITH UNTRUSTED EMAILS

CROSS-REFERENCE TO RELATED APPLICATIONS

This patent application claims priority to and the benefit of U.S. Provisional Patent Application No. 62/653,862, titled "SYSTEMS AND METHODS FOR PROVIDING USER INTERFACES BASED ON ACTIONS ASSOCIATED WITH UNTRUSTED EMAILS," and filed Apr. 6, 2018; U.S. Provisional Patent Application No. 62/539,204, titled "SYSTEMS AND METHODS FOR DYNAMICALLY ADAPTING USER INTERFACES BASED ON ACTIONS ASSOCIATED WITH UNTRUSTED EMAILS," and filed Jul. 31, 2017; and U.S. Provisional Patent Application No. 62/503,212, titled "SYSTEMS AND METHODS FOR PROVIDING USER INTERFACES BASED ON ACTIONS ASSOCIATED WITH UNTRUSTED EMAILS," and filed May 8, 2017. The contents of all of which are hereby incorporated herein by reference in its entirety for all purposes.

FIELD OF THE DISCLOSURE

This disclosure generally relates to systems and methods for providing a user interface to confirm whether to review or take an action associated with an untrusted email. In particular, the disclosure is directed to systems and methods for providing and enabling an administrator to dynamically customize a user interface to confirm whether to review or take an action associated with an untrusted domain from the untrusted email.

BACKGROUND OF THE DISCLOSURE

A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs.

It can be useful to perform simulated phishing attacks on a user or a set of users. Simulated phishing attacks allow an organization to determine the level of vulnerability to phishing attacks of a user or set of users. This knowledge can be used by interne technology organizations to reduce this level of vulnerability through tools or training.

In general, there are a variety of anti-ransomware technologies that attempt to protect computers before they get infected by cybersecurity attacks such as phishing attacks. These anti-ransomware technologies can prevent ransomware, malware, and spyware attacks that result from phishing attacks or other attacks. For example, one anti-ransomware product leverages an artificial intelligence engine to detect and eliminate ransomware, malware, and zero-day threats before they can infect a computer or encrypt the computer's data.

BRIEF SUMMARY OF THE DISCLOSURE

While anti-ransomware technologies may be used to prevent phishing attacks, these technologies do not provide any training on how to approach or act with respect to suspect phishing attacks. The anti-ransomware technologies are entirely in control in removing threats (e.g., removing phishing emails) without giving a user a chance to make decisions with respect to a suspect or untrusted phishing email. It has been discovered that there is a need by companies for their employees to be well-trained in spotting phishing emails and how to act with respect to phishing emails.

The present solution addresses the above-described need by giving users autonomy in making decisions with respect to phishing emails. The present solution enables the provision of training and education by allowing users to review and reconsider decisions made with respect to emails that the system recognizes as potential phishing emails and by collecting and analyzing the information that the user decisions yield.

The present solution provides a system that notifies users regarding specific user decisions with respect to untrusted phishing emails. The system notifies users when users perform specific actions with respect to the untrusted phishing emails. The system pauses execution of these actions and prompts the user to confirm whether to take the actions or to revert back to review the actions. In contrast from anti-ransomware technologies which are entirely in control, the present solution gives the user autonomy in deciding actions relating to untrusted phishing emails. The present solution interrupts execution of actions related to untrusted phishing emails in order to give users a choice on whether to proceed with actions.

It is important that the message that is presented to a user when the user performs specific actions related to untrusted phishing emails is structured in a way that the user understands and can relate to. Different industries and businesses use different vocabulary and terminology, and presenting messages to users with unfamiliar terminology or vocabular or structure or format may cause confusion and may not have the desire effect of convincing the user to rethink their action with respect to the untrusted message. Allowing a company administrator to dynamically and independently control the structure, content and wording of notifications raised to the user empowers the administrator to ensure that end-users will better understand what is expected of them when a notification is raised. This will result in more confident users who will be less prone to making mistakes, thus saving the company from dealing with impacts resulting from users interacting with phishing emails and other untrusted messages which cause harm to the company's systems.

Traditional methods of customizing the presented notification are slow and cumbersome and require the company administrator to contact and work with the security awareness system administrator every time the company administrator wants to modify a notification. The present invention allows the company administrator to change many aspects of the notifications displayed to their users, and the company administrator changes are automatically recognized, implemented and deployed by the security awareness system without requiring any interaction with the security awareness system administrator. Further, the present invention allows the company administrator to create different notifications for different groups of users, allowing further customization of the warning notification, resulting in even stronger and more relevant teaching opportunities.

Methods, systems and apparatus are provided in which a system customizes notifications to be displayed on a client. In one embodiment, the notifications are displayed on a user interface used to confirm whether to review or proceed with taking an action associated with an untrusted email. Notifications to display to the user are configurable by a company administrator via the administrator's console which interacts with the server. The server maintains a plurality of settings that are used to create one or more notifications to display on the client device to create notifications to be displayed on a client. The client device maintains a local copy of values of the plurality of settings used that are used to create one or more notifications to display on the client device. In one embodiment, the notifications may be used to alert a user about the potential dangers of their actions with respect to untrusted messages, for example suspected phishing emails. The server maintains hashes of one or more groups of settings for a client, where the one or groups of settings are used to create notifications for one or more different user groups for the company. The client device maintains a client setting hash of the local copy of the plurality of settings.

Methods, systems, and apparatus are provided in which a system provides a user interface to confirm whether to review or take an action associated with an untrusted email. A driver on a device monitors the startup of any processes. Responsive to monitoring, the driver detects an application process that was created that indicates than an application was launched and notifies a user console about the creation of the application process. The user console determines if the application process is of significance, if so, it injects a monitor library into the process. Once injected into the process, the monitor library detects if the application process receives an action of a user to access a domain that is not identified as trusted. The monitor library notifies the user console of the user's URL-access request. The monitor library then pauses the URL request waiting for the user console instruction. Once informed of a URL-access request, the user console then resolves the URL (Punycode, tinyurl or any other) to its true form and then queries the server to find out if the URL is trusted or not. Along with the query, the user console sends the client setting hash of the local copy of the plurality of settings stored on the client device.

The server compares the client setting hash with a serving setting hash. If the client setting hash does not match the server setting hash, then the server returns updated values of one or more of the plurality of settings, the server settings hash and the result of the query, to the client device. If the server returns updated values of one or more of the plurality of setting to the client device, the client device locally stores the updated values of one or more of the plurality of settings. Based on the results of the query to the client device, the user console determines that it will display one or more notifications on the client device, the one or more notifications utilizing the local stored copy of the plurality of settings.

The user console then listens for a response from the user to confirm whether or not to open the URL or revert back to review the action. Once the user has decided to either revert or continue the URL request, the user response may be recorded to a remote server. The user response is also passed on to the monitor library which either resumes the URL request or disregards it.

In some aspects, the present solution provides a method for providing a user interface to confirm whether to review or take an action associated with an untrusted domain. The method may include any of the following steps, processes or actions:

monitoring, by a driver on a device, process creation and termination;

detecting, by the driver responsive to monitoring that an application was created and notification of that process to a Second Chance core process (Second Chance Core) running at the user level.

determination, by the Second Chance Core, whether or not to monitor the given process.

injection, by Second Chance Injector, of monitoring code into the process to be monitored detecting, by the monitoring code, that an application received an action of a user to access a domain that is identified as untrusted;

notification, by the monitoring code, to Second Chance Core the action of the user prior to accessing the domain;

suspension, by Second Chance Core, of the monitored process prior to accessing the domain notification, by Second Chance Core, of the suspended process to a user console process (the User Console).

displaying, by the User Console, while execution of the application is paused, a user interface, containing translated URL data if required, to receive input from the user to confirm whether to take the action or to revert back to review the action; and notification, by Second Chance Core, of customer response to Second Chance core so it can either resume or terminate execution of the application based on the input.

In some implementations, receiving input via the user interface from the user may include confirming to take the intercepted action and responsive to the input, allowing the application to continue to process the intercepted action. In some implementations, methods may include receiving input from the user to revert back to review the action and responsive to the input providing access to the application for the user to review a point in the application at which the user took the action. In some implementations, methods may include identifying, by the driver, one or more processes initiated from the application. In some implementations, methods may include associating the one or more processes with at least one of the application, the action taken by the user, or the domain.

In some implementations, methods may include tracking, by the monitoring code, actions of the user taken to open a file obtained from a phishing email. In some implementations, methods may include detecting, by the monitoring code, the action of the user to access the domain comprising a click by the user on a uniform resource locator provided via one of the application or a process associated with the application. In some implementations, the application is one of paused or resumed by the client service. In some implementations, methods may include receiving, by the client service, from a server a predetermined list of domains identified as one of untrusted domains or trusted domains. In some implementations, methods may include obtaining, by the user console, from storage of the device a predetermined list of domains identified as one of untrusted domains or trusted domains.

In some aspects, the present solution provides a system for providing a user interface to confirm whether to review or take an action associated with an untrusted domain. The system may include of the following components, modules or executable instructions:

a driver executable on a processor of a device and configured to monitor process creation/termination;

a client library configured to and capable of receiving notifications from the driver executable and capable of determining whether or not the given process needs to be monitored;

an injector process executable configured to and capable of injecting monitoring code into the given process for the purpose of monitoring the process;

monitor library configured to and capable of monitoring all processes (e.g., Outlook, all other Microsoft Office programs, Adobe Reader, Sumatra PDF Reader, FOXIT Pdf reader, . . . ), each requiring component specific code to accomplish said monitoring and pausing/resuming those processes on demand;

a core library configured to and capable of creating shared memory to accomplish bi-directional communication with the monitored libraries injected into the monitored programs, and capable of communicating with a user console;

a user console executable of the device configured to and capable of communicating with the core library and Server to act upon URL detections and configured to display and react to prompts to signal the monitored program via the core to either resume or revert the process in question based on input.

In some implementations, the client service is further configured to receive input via the user interface from the user confirming to take the intercepted action and responsive to the input, allowing the application to continue to process the intercepted action. In some implementations, the client service is further configured to receive input from the user to revert back to review the action and responsive to the input providing access to the application for the user to review a point in the application at which the user took the action. In some implementations, the driver is further configured to identify one or more processes initiated from the application. In some implementations, the monitor library is further configured to associate the one or more processes with at least one of the application, the action taken by the user, or the domain. In some implementations, the monitor library is further configured to track actions of the user taken to open a file obtained from a phishing email. In some implementations, the monitor library is further configured to detect the action of the user to access the domain comprising a click by the user on a uniform resource locator provided via one of the application or a process associated with the application.

In some implementations, the application is one of paused or unpaused by the monitor library in response to commands from the core originating from the client service. In some implementations, the user console is further configured to receive from a server a predetermined list of domains identified as one of untrusted domains or trusted domains. In some implementations, the user console is further configured to obtain from storage of the device a predetermined list of domains identified as one of untrusted domains or trusted domains.

In some aspects, the present solution is directed to a method for providing a user interface to confirm whether to review or take an action associated with an email. The method may include any of the following actions, steps or processes:

monitor library capable of monitoring all processes (e.g., Outlook, all other Microsoft Office programs, Adobe Reader, Sumatra PDF Reader, FOXIT Pdf reader, . . . ), each requiring component specific code to accomplish said monitoring and pausing/resuming those processes on demand;

a core library capable of creating shared memory to accomplish bi-directional communication with the monitored libraries injected into the monitored programs, and capable of communicating with a user console; and a user console executable of the device capable of communicating with the core library and Server to act upon URL detections and configured to: display, and react to prompts to signal the monitored program via the core to either resume or revert the process in question based on input.

In some implementations, the action comprises a user accessing an untrusted URL associated with the email, or a user opening an attached file and then accessing an untrusted URL associated with the email.

The methods, systems and apparatus further comprise calculating the client setting hash by concatenating values of the plurality of settings into a string and applying a hash function to the string. The system may determine that the content of the email has one or more attributes associated with the simulated phishing email. The system may transmit an empty client setting hash on an initial request to the server to return current values of the plurality of settings and current server setting hash maintained by the server. The notification displayed by the system may be configured based on the updated values of the one or more plurality of settings.

In one embodiment, a method is provided for determining that a second notification is to be displayed for as second suspected phishing email, transmitting the client setting hash to the server. If the client settings hash matches the server settings hash, then the system does not receive updated values of one or more of the plurality of settings.

In another embodiment, the plurality of settings comprises values to provide content for one or more of the following: message title, text field, OK button, cancel button, and help link. In another embodiment, the plurality of settings comprises values to specify visibility of one or more of the following: text field, OK button, cancel button, remember checkbox and help link. In another embodiment, the plurality of settings comprises values to specify one of foreground or background colors of one or more user interface elements of the notification.

In one embodiment, a system is provided for updating setting of a notification to be displayed on a client. The system displays on the client notifications that are configurable through settings on the server, to identify that an email is a suspected phishing email. The client device stores the plurality of settings; the system calculates a client setting hash using the values of the settings on the client device. If the system determines that a notification is to be displayed for the suspected phishing email; the client setting hash is transmitted to the server, and if the client setting hash does not match the server setting hash, then updated values of one or more of the plurality of settings and the server setting hash are send to the client to be used for configuring the notification.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3B depicts an implementation of a method for providing a user interface to confirm whether to review or take an action associated with an untrusted domain; the prompt using updated values of one or more of a plurality of settings;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for providing user interfaces based on actions associated with untrusted emails.

A. Computing and Network Environment

Figure 1A:
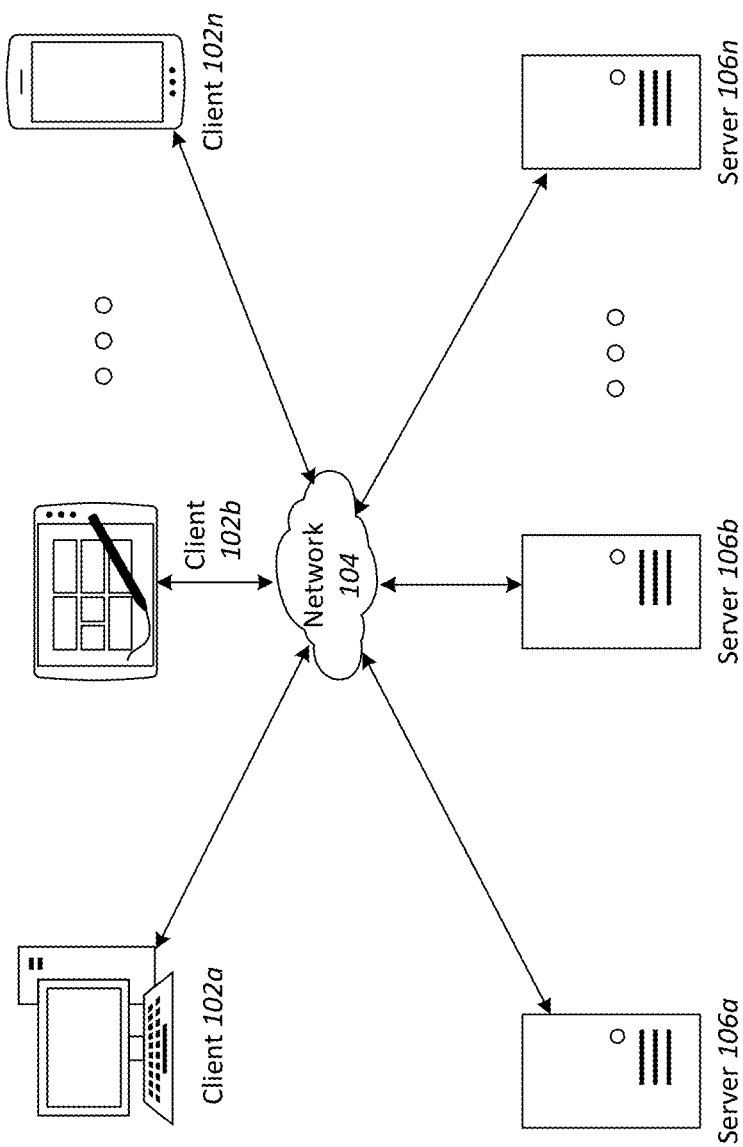
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s)

106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers 106 may be referred to as a server farm (not shown) or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALB OX.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
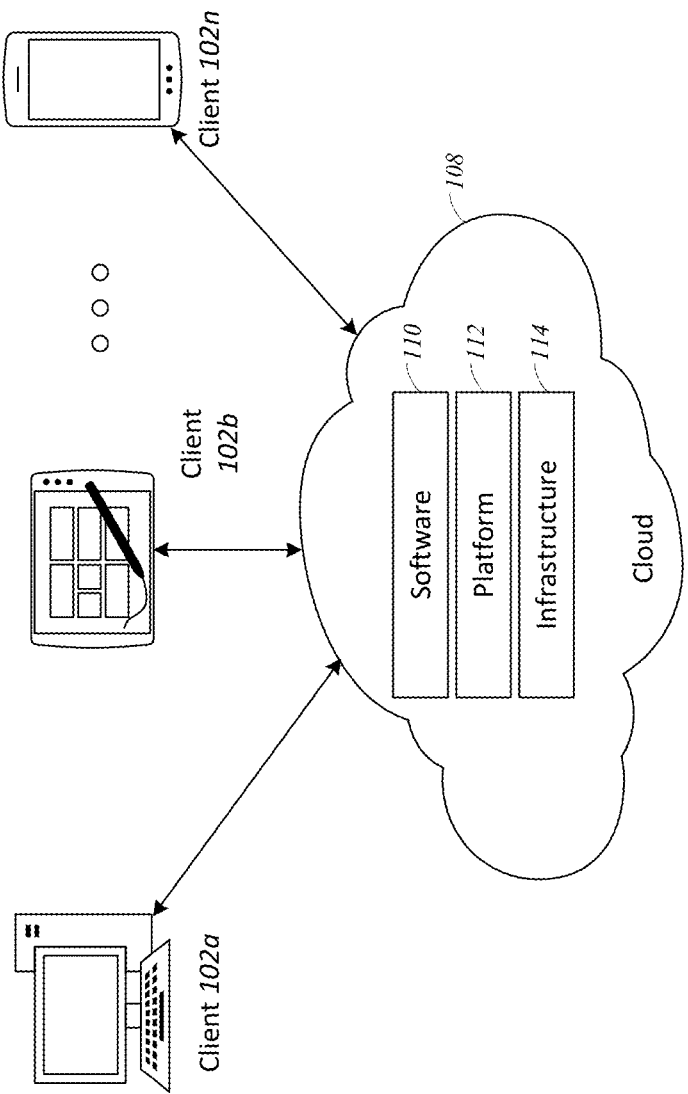
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with a cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients 102. The servers 106 may be located off-site in remote geographical locations as disclosed above or otherwise. Public clouds may be connected to the servers 106 over a public network. Private clouds may include private servers 106 that are physically maintained by clients 102 or owners of clients 102. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS 114 may refer to a user renting the use of infrastructure resources that are needed during a specified time period. IaaS providers may offer storage, networking, servers or virtualization resources from large pools, allowing the users to quickly scale up by accessing more resources as needed. Examples of IaaS 114 include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS 112 include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS 110 include GOOGLE APPS provided by Google Inc., SALESFORCE provided by Salesforce.com Inc. of San Francisco, Calif., or OFFICE 365 provided by Microsoft Corporation. Examples of SaaS 110 may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server 106 or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
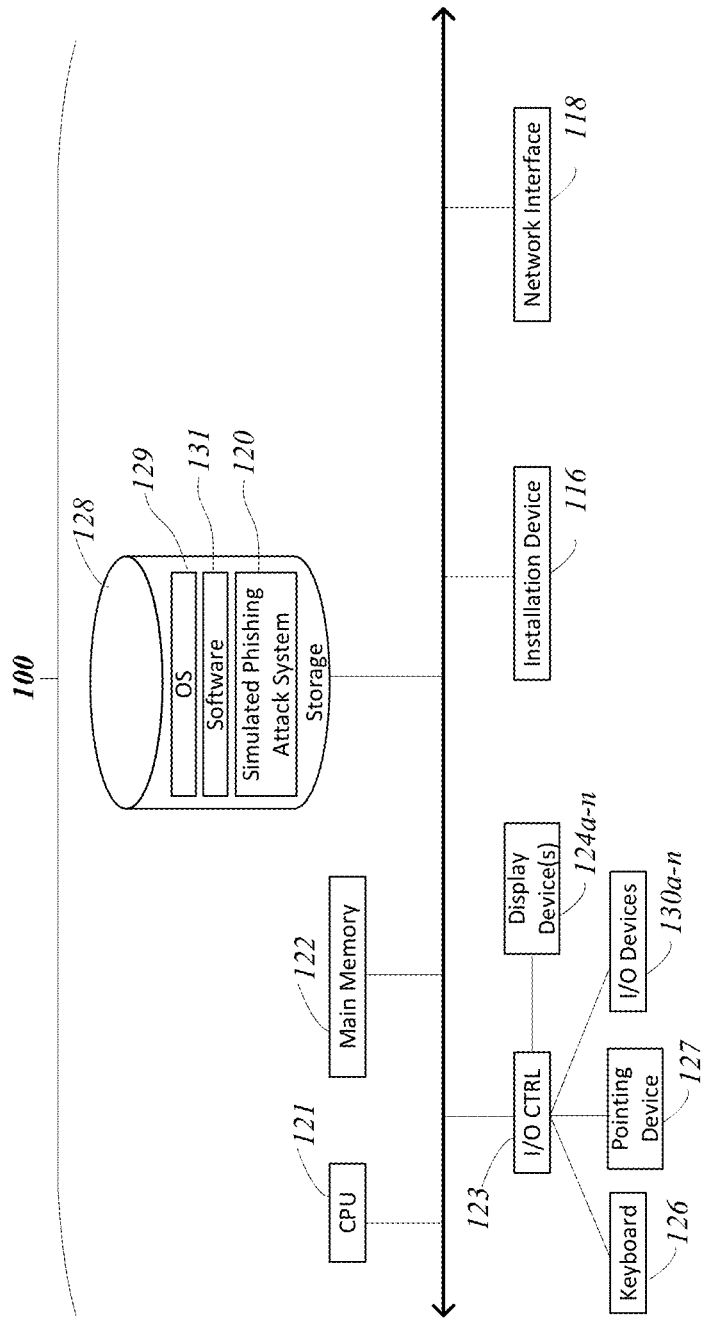
FIGS. 1C and 1D are block diagrams depicting embodiments of computing devices useful in connection with the methods and systems described herein.
Figure 1D:
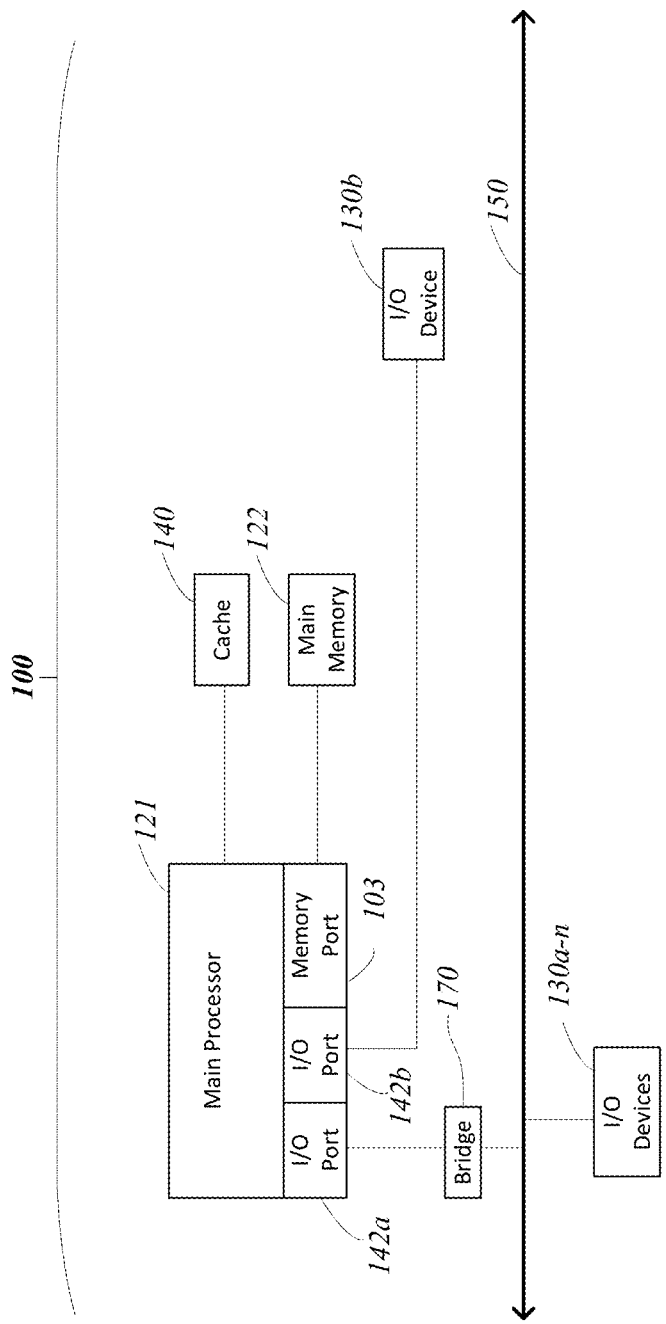

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit (CPU) 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system 129, a software 131, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), I/O ports 142a-142b, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121 (e.g., microprocessor). Main memory unit 122 may be volatile and faster than storage device 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage device 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 (e.g., a main processor) communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the main processor 121 communicates with various I/O devices 130 via a local system bus 150. Various buses may be used to connect the main processor 121 to any of the I/O devices 130 via I/O ports 142a-142b, including a PCI bus, a PCI-X bus, or a PCI-Express bus, or a NuBus. For embodiments in which the I/O device is a video display device 124, the main processor 121 may use an Advanced Graphics Port (AGP) to communicate with the display device 124 or the I/O controller 123 for the display device 124. FIG. 1D depicts an embodiment of a computing device 100 in which the main processor 121 communicates directly with I/O device 130b or other processors 121' (not shown) via HYPERTRANSPORT, RAPIDIO, or INFINIBAND communications technology (via I/O port 142b). FIG. 1D also depicts an embodiment in which local busses and direct communication are mixed: the main processor 121 communicates with I/O device 130a using a local interconnect bus while communicating with I/O device 130b directly (via I/O port 142a).

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

I/O devices 130a-130n may include a combination of multiple input or output devices, including, e.g., Microsoft KINECT, Nintendo Wiimote for the WII, Nintendo WII U GAMEPAD, or Apple IPHONE. Some I/O devices 130a-130n allow gesture recognition inputs through combining some of the inputs and outputs. Some I/O devices 130a-130n provides for facial recognition which may be utilized as an input for different purposes including authentication and other commands. Some I/O devices 130a-130n provides for voice recognition and inputs, including, e.g., Microsoft KINECT, SIRI for IPHONE by Apple, Google Now or Google Voice Search.

Additional I/O devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices 124a-124n may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124 n may be provided by one or more other computing devices 100a or 100b (not shown) connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the computing device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system 129 or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage device 128 may be non-volatile, mutable, or read-only. Some storage devices 128 may be internal and connect to the computing device 100 via a system bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some computing devices 100 (e.g., client devices 102) may not require a non-volatile storage device 128 and may be thin clients 102 or zero clients 102. Some storage devices 128 may also be used as an installation device 116 and may be suitable for installing software and programs. Additionally, the operating system 129 and the software 131 can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, A™, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computing device 100 (i.e., computer system) can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computing device 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 (i.e., client device) includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Providing User Interfaces based on Actions Associated with Untrusted Emails.

This disclosure generally relates to systems and methods for providing user interfaces based on actions associated with untrusted emails.

In one embodiment, a method provides a user notification to confirm whether to review or take an action associated with an untrusted email. For example, a driver on a device monitors the startup of any processes. Responsive to monitoring, the driver detects an application process that was created that indicates that an application was launched and notifies a user console about the creation of the application process. The user console determines if the application process is of significance, and if so it spawns an injector process to inject a monitor library into the application process. Once injected into the application process, the monitor library detects if the application process receives an action of a user with respect to an email to access a domain that is not identified as trusted. The monitor library notifies the user console of the user's URL-access request. The monitor library then pauses the URL request waiting for the user console instruction. Once informed of a URL-access request, the user console then resolves the URL (Punycode, tinyurl, or any other) to its true form and then makes a query to the server to determine if the URL is trusted, untrusted, or unknown. The user console sends client settings hash of the values of the locally stored plurality of settings to the server with the query. The server compares the client settings hash with a hash of the server stored version of the values of the plurality settings (the server settings hash). If the server settings hash and the client settings hash are the same, the server sends the results of the query to the user console. If the server settings hash and the client settings hash are different, then the server sends the results of the query to the user console along with the server settings hash and the updated values of the plurality of settings. Responsive to receiving an updated server settings hash and updated values of the plurality of settings, the user console stores locally the updated server settings hash and the updated values of the plurality of settings. Responsive to the results of the query, the user console displays a user notification based on the locally stored values of the plurality of settings, to receive input from the user to confirm whether to take the action or to revert back to review the action. Responsive to the user input, the user console may record the user input on a remote server. The user console passes the user input to the monitor library which either unpauses the URL request or discards it. For this embodiment, the action can include a user accessing a domain associated with the untrusted email, a user responding to the untrusted email, or a user opening an attached file associated with the untrusted email.

In another embodiment, a method provides a user interface to confirm whether to review or take actions associated with an untrusted domain. For example, a driver on a device monitors the startup of any processes. Responsive to monitoring, the driver detects an application process that was created that indicates that an application was launched and notifies a user console about the creation of the application process. The user console determines if the application process is of significance, and if so it spawns an injector process to inject a monitor library into the application process. Once injected into the application process, the monitor library detects if the application process receives an action of a user to access a domain that is not identified as trusted. The monitor library notifies the user console of the user's URL-access request. The monitor library then pauses the URL request waiting for the user console instruction. Once informed or a URL-access request, the user console then resolves the URL (Punycode, tinyurl, or any other) to its true form and then makes queries to determine if the URL is trusted, untrusted, or unknown. Responsive to the results of the query, the user console displays a user interface to receive input from the user to confirm whether to take the action or to revert back to review the action. Responsive to the user input, the user console may record the user input on a remote server. The user console passes the user input to the monitor library which either unpauses the URL request or discards it.

In another embodiment, the company administrator via the user console can update the notification message title, text fields, the content of the OK button, the content of the cancel button, the content of the URL help link, the URL destination for the help link, the present of the remember checkbox to save the response and prevent future notifications, the background and foreground colors of all of the message items, and the visibility of text fields, the OK button, the cancel button, the remember checkbox and the URL help link.

In some aspects, unpausing execution of the application further includes receiving input via the user interface from the user confirming to take the intercepted action and responsive to the input, allowing the application to continue to process the intercepted action. In other aspects, unpausing execution of the application further includes receiving input from the user to revert back to review the action and responsive to the input providing access to the application for the user to review a point in the application at which the user took the action.

In some aspects, monitoring process execution of the application further includes identifying, by the driver, one or more processes initiated from the application. The methods or systems can further include associating the one or more processes with at least one of the application, the action taken by the user, or the domain. In other aspects, monitoring process execution of the application further includes tracking, by the monitor library, actions of the user taken to open a file obtained from a phishing email.

In some aspects, detecting that the application received the action of the user to access the domain further includes detecting, by the monitor library, the action of the user to access the domain comprising a click by the user on a uniform resource locator provided via one of the application or a process associated with the application.

In some aspects, the application is one of paused or unpaused by one of the driver or the monitor library.

In some aspects, the methods or systems further include receiving, by the user console, from a server a predetermined list of domains identified as one of untrusted domains or trusted domains. In other aspects, the methods or systems further include obtaining, by the user console, from storage of the device a predetermined list of domains identified by an administrator of the device as one of untrusted domains or trusted domains.

In some aspects, a browser based email client system and method are presented. For implementation with browser based email clients where the implementation of extensions, add-ins, plugins, and browser helper objects is not desired, a monitor library equipped with a URL navigation monitoring module (URLNMM) is injected into an application or process. URLNMM is a piece of code that can monitor the URL-navigation functions or APIs invoked by the injected process. The methodology can also be used in the browser-based implementation to monitor browser-based email services. Non-limiting examples of browser-based email services that can be monitored are Outlook and Gmail, which may, for example, be run from an Internet Explorer browser.

The URL navigation monitoring module (URLNMM) is a piece of code within the monitoring library that keeps track of the webpages or links being navigated-to and navigated-from by web browsers. It is also responsible for virtually "pausing" user navigation and if needed, re-routing flow in most browsers. For example, the URLNMM can opt to redirect any connection to www.zzzz.com to www.yyyy.com, or it can be configured to just ignore requests to www.zzzz.com. URLNMM can be injected into a web browser application. However, it can also be implemented as a plugin, add-in, extension or browser helper object. For Second Chance to start prompting on URLs navigated to by web browsers, Second Chance first detects a successful email login, for example for Outlook OWA, or Gmail. Without this detection, Second Chance will prompt on almost all URLs navigated to. For example, a user logs into his or her Gmail account using a web browser (for example, Chrome), Second Chance's URL navigation monitoring detects a successful login and starts URL navigation monitoring. If the user clicks on a link in that particular tab, then Second Chance records, prompts and reacts to that particular action.

In some aspects, a browser based email client system and method are presented. For implementation with browser-based email clients where extensions are desired, a Second Chance extension equipped with a URL navigation monitoring module (URLNMM) is installed and executed within the web browser application. Extension-based URLNMM is a piece of code that can monitor, manage and redirect the user's URL-navigation actions while using the browser where the Second Chance extension is installed. Non-limiting examples of browser-based email services that can be monitored are Outlook and Gmail, which may, for example, be run from EDGE or Chrome browser(s).

The Extension based URLNMM, shares a majority of its algorithm with the URLNMM implemented in the monitor library. It activates its URL monitoring and redirection code, whenever one or more tabs are used to successfully login to an email service. It also stops monitoring user URL-navigation if the web browser tab is not within a known and supported email service domain (i.e. logging out from https://outlook.office365.com/owa/).

Unlike the URLNMM included in the Monitor Library, extension based URLNMM can not directly communicate nor manipulate objects and applications running in the Operating System. This security limitation is set by most browsers to all running extensions. To be able to communicate with the Operating System and its objects, the Second Chance URLNMM extension invokes a Browser Intermediary Application (BIA), as specified by the browser's extensions API, to communicate with the operating system's services and objects.

The Browser Intermediary Application (BIA) is a Second Chance computer program that allows any extension-/plugin based Second Chance URLNMM implementation to interact with the underlying OS, Second Chance services and applications. This allows the Second Chance extension to acquire configuration data from the Second Chance service or database, allows the browser to prompt as a separate window from the browser, and other operations that require escalated privileges. BIA was implemented because modern browsers like Chrome, Firefox and EDGE have discouraged and removed all direct communication between the OS and their browsers (and loaded extensions) for security reasons.

A simulated phishing attack may test the readiness of a security system or users of a system to handle phishing attacks such that malicious actions are prevented. A simulated phishing attack or actual phishing attack may, for example, target a large number of users, such as employees of an organization. Such attacks may be performed by a party friendly or neutral to the targets of the attacks. In one type of phishing attack, an attempt is made to extract sensitive information using phishing methods. For the simulated phishing attack, any extracted information is used not for malicious purposes, but as part of a process of detecting weaknesses in security. Performing the simulated phishing attack can help expose a lack of vigilance and/or know-how in a user or set of users of a device. This information can be used to provide targeted training or remedial actions in order to minimize risk associated with such attacks. For example, user know-how can be improved by providing targeted, real-time training to the user at the time of failing a test provided by the simulated phishing attack.

Phishing attacks occur frequently by way of phishing emails. Phishing emails are typically masqueraded as emails from parties known to the users, such as an executive of a company that employs the users. The phishing emails may be designed to appear interesting to the users, and may offer or promise, for example, access to an interesting tidbit of news, access to useful computer software, access to knowledge of how to perform a money-making scheme, or any other thing that may be of interest. In some embodiments, the phishing emails may request that the user perform a certain action, such as clicking on a link, providing sensitive information by replying to the email, or transferring money to an account owned by the attacker and then sending a reply email to confirm that the money has been transferred. A common attack vector used by phishing emails is to get users to click on links in an email or to click on links delivered in documents attached to phishing emails.

The present invention offers several benefits to client companies and end users of companies with respect to cybersecurity training. The present invention can provide training with respect to simulated phishing attacks as well as real world phishing attacks. Specifically, the present invention offers training when users click on links in, or delivered via, untrusted emails thus providing real-world training by way of experience whenever a user clicks on links of an untrusted email. The prevent invention offers the ability to turn back time and provides users with a second chance after performing an action (e.g., clicking on links). This gives users the opportunity to try again and revert back to review their action before making a decision (i.e., pausing action of mistakenly clicking on link of phishing email).

The present invention can provide the ability for a company administrator to update several settings with respect to notifications presented to users without having to work with the security awareness system administrator. In order for a notification to be helpful, it needs to resonate with the user. If the notification does not use the proper language for an industry or vocabulary, tone and content that are inherent and familiar to a particular business, then this causes confusion for end users who may subsequently make a mistake in deciding whether or not to proceed with the potentially unsafe action. Allowing a company administrator to easily control the wording and presentation of notifications at any time empowers the company administrator to ensure their end users will better understand what is expected of them when a notification is raised. The updated settings are immediately available on all new notifications, which allows the administrator to quickly and easily edit, test, and tweak the content and presentation of their notifications, greatly reducing the time for configuration over traditional ways of distributing configuration data to clients The present invention functions by watching messaging applications, processes, browsers, Microsoft Word, Adobe PDF and possibly other applications based on values in a dynamically changeable list. The present invention acts as a guide by reinforcing training in real world situations and empowering users to turn back time and re-think actions (e.g., rethink clicking a link before proceeding).

The present invention has several possible applications. For example, the present invention can provide real time training enhancements, such that the system is configured to raise a prompt whenever a user takes a potentially dangerous action. For example, the system may remind the user of specific aspects of their training by highlighting in the email the potential threats that the user has been exposed to in security training (e.g., "Did you verify the 7 red flags before clicking?") In this way, the present invention serves to enhance end users' security awareness to make them intelligently avoid document files (DOC, XLR, RFT, TXT, PDF, and others) and other applications with the capability to execute malicious code via a macro. In some aspects, the present invention uses the prompt to generally remind the user that they should be more diligent (e.g., "Do you want to turn back time and review the email more closely?") The present invention can provide pre-training protection such that new hires are placed into a group where the users are limited in what action they can take until they have passed security training. In some aspects, the security training assigned to the user may be based on how the user responds to the present invention system (e.g., Did the user click on links? Did the user still proceed to click on link after being prompted?) The company administrator can further customize alert actions sent to users when they take a potentially dangerous action, such as Ignore (let the action proceed and do nothing), Report (let the action proceed and report and/or track the action), Prompt (ask the user to rethink and review the action that they took and give them a second chance to perform an action), or Prevent (do not let the action proceed, may be combined with reporting). In some aspects, therefore, the present invention provides network administrators the choice to either continue or stop the user from opening the file or the macro within the file. In another example, the present invention can be used as part of a training reinforcement tool that sends daily notifications to an administrator or to users showing users' number of potentially harmful clicks made the day before. These notifications when sent to users are intended to remind users to think before they click on links of untrusted emails. The present invention records the instances of risky user behavior, in terms of accessing URLs from different sites that are unknown or that are known to be untrusted. The invention may further analyze and use this information to customize training for a user, to enforce training for a user, and/or to improve the security of the overall system. The invention further enables the system to pinpoint the users who need to be educated more, and in what specific ways. The invention further provides network administrators and cybersecurity educators a means to monitor and record the behavior of their end users and measure education effectiveness. The present invention also provides network administrators and cybersecurity educators better insight into typical end user behavior through behavior data collection and analysis, so they can better tailor their products to fit their customer's needs.

The present invention provides several benefits. As the present invention is not security software, there are no definitions or scans. The present invention may be provided as a software as a service (SAAS) product, thus no server software needs to be installed. For example, for the SAAS, users only need to sign-up to use the service. SAAS uses limited client resources compared to other security systems. The present invention provides the benefit of clients being able to customize the system—e.g., how users are configured to interact with the system, actions taken by users, and prompt text may be customizable. The present invention can be provided such that it is active immediately after installation, thus no initial scans are needed.

In one embodiment, a system and method perform a website link and domain analysis with respect to phishing attacks. The system determines if a website link is associated with a possible phishing site (i.e., untrusted list) or with a non-phishing site (i.e., trusted list) based on pre-determined domain lists. The system and method protect the end user from making these types of bad security decisions (e.g., clicking on a link from an untrusted source) while also giving the end user autonomy in making a final decision.

In some embodiments, a company administrator can sign in to the user console and configure the content of the available notifications, including the color, text size, and visibility for all configurable options. The administrative console may contain a screenshot of what each notification will look like with the default settings and with the administrator configured settings. In some embodiments, the administrator may modify any of the following settings:
  Content of message title;
  Content of text fields;
  Content of OK button;
  Content of cancel button;
  Content of URL help link;
  URL destination for help link;
  Remember? Checkbox to save response and prevent future notifications;
  Background and foreground colors of all the above items; and
  Visibility of text fields, OK button, cancel button, Remember? Checkbox and URL help link.

In some embodiments, as soon an any setting is changed, the administrator can perform the action in the application that raises the prompt in question to see what the prompt will look like to the end users. There may be a license key associated with each company account. When a company administrator installs the client software on the client device, the company administrator may include the license key as a command line parameter to automatically register the client with the account he i administering in the user console. In some embodiments, the account settings data is stored in a database on the server and is accessed via an API. When the client sends a query to the server related to a user action, the settings hash currently utilitized by the client is transmitted to the server. If this client settings hash matches the settings hash stored on the server for that client, then updated settings data is not returned to the client along with the response as to whether or not a notification should be raised. If the client settings hash does not match the settings hash of the server for that client and it is determined that a notification should be raised, the updated settings data is returned to the client along with the new server settings hash along with the response indicating that a notification should be raised to the end user. The client then stores the new settings hash along with the new settings in local storage.

One of the advantages of the present invention is the ease of use and immediacy of results. Configuring software can be a long and arduous process. With the present invention, an administrator can immediately view the results of their settings changes while editing and can quickly tweak those results simply by editing a value on the user console and generating a notification on the client. In addition to the ease of configuration, administrators can customize the content of the messages to their individual organization, thus reducing end user confusion and improving the ability to provide real-time training and guidance to users. Another advantage of the present invention is the ability of the system to immediately and efficiently provide the altered configuration setting to the client before another notification is raised to a user using the inventive transmission and validation of the settings hashes using the API.

Another way of implementing the invention is to use a different method from the hash comparison to determine if the settings have been updated since the last time the client received an update. This can be facilitated by storing a date on both the server and the client which represents the date when the settings were last updated. If the date on the server becomes more recent than the date stored at the client, then the settings have been updated since the last time the client requested updates and thus need to be sent to the client. This mechanism can be used both in a proactive manner, passing the last 'updated at' date on each API call or in a periodic call into the API meant for ensuring the latest updates are on the client. In some embodiments, the date includes both a date and time.

In some embodiments, client driver 215 is a driver that watches for the creation and termination of applications. The driver 215, informs the user console 216 of the newly created process. user console 216, upon receiving the process information, suspends the newly created process and determines if it is to be monitored. If the new process is not for monitoring, user console 216 resumes the new process from suspension. If it is for monitoring, user console 216 starts the injector process 222 to inject the newly started process with the monitor library DLL 224.

The monitor library DLL 224 is a library injected into applications. This library performs many functions, including detection of network access associated with browsing to a URL. This library is capable of monitoring function calls, changing program flow and/or outcome of a function call. For example, it can re-route a request to display "hello world" into "goodbye world". In the case of Second Chance, the monitor library DLL 224 primarily detects and re-directs program flow for any API calls to launch external applications like CreateProcess( ) or ShellExecute( ). It also detects and redirects program flow for any of the supported APIs like NtCreateFile, NtOpenFile, and others.

Whenever a user requests for the opening of a URL from an email client, the injected process, using the monitor library DLL 220, writes information into the shared memory maps 219 and raises event signals so that other processes monitoring the shared memory maps 219 knows an entry was created.

User console 216, using the core library DLL 220, monitors events raised due to changes in the shared memory map 219. Such events can include putting on a hold a request to access a URL. The core library DLL 220 exposes methods so that the user console 216 can pass on the response of end-users to the core library DLL 220 which routes the response via the shared memory map 219 to monitor library DLL 224 residing in the application process so that it can take the appropriate action.

When information is available from the shared memory map 219, user console 216 reads data from the shared memory maps 219, using the core library DLL 220. This is how the user console 216 gets the URLs which the end user has clicked. The core library DLL 220, also enables user console 216 to write data to the shared memory maps which the monitor library DLL 224 reads. This is how the monitor library DLL 224 gets its cue from the user console 216 to either continue or abort the action of navigating to a URL.

The user console 216 is a service code that marshals itself into user mode space so that it can effectively raise prompts and respond to an end-users actions. User console 216 listens for events using core library DLL 220, contacts the remote server 106 via the Second Chance API so that it can disposition the URL and then take the appropriate actions like raising a dynamically formatted prompt based on the disposition received. In addition, user console 216 forwards the response back to the process injected with monitor library DLL 224 via core library DLL 220 and the shared memory map 219 so that the process injected with monitor library DLL 224 can take action on the users decision. The user console 216 is started by the client service 214 which in turn is continually monitored by the watch dog service 210; if it detects that client service 214 has terminated it will automatically restart the client service 210. Process shutdown is accomplished by turning off the watch dog service 210 first, and then the client service 214.

The client service 214 runs as administrator on the computer. The client service 214 monitors the operating system for user login/logout/connect/disconnect events to ensure that a user console process 216 is running for each logged in user. Only a process running in the same session as the user is capable of raising a UI element to the end-users.

Watchdog service 210 ensures the client service 214 is running. The service runs as a delayed start windows service to ensure it starts 2 minutes after system start-up. Mostly created to overcome a bug in early versions of Windows 10 which resulted in most non-Windows services failing to start, it has proven very useful in ensuring the client service 214 and ultimately the user console 216 are running.

The browser-based email client may be utilized to view emails. For example, IE, Chrome, Firefox, Edge, Safari, Opera, and Waterfox. In this case, Second Chance can be implemented as either injected code or as a browser extension or plugin.

In some embodiments where extensions or plugins are not preferred for browsers, Second Chance can be implemented as injected code similarly to how it works with standalone email client applications (i.e. Outlook). When a user turns on a computer where Second Chance is installed and logs in, the Second Chance user console gets activated and starts receiving data from the client driver 215. Once a user opens an instance of the Internet Explorer (IE) browser, the Second Chance client driver 215 detects the creation of the process and informs the user console 216.

User console 216, upon receiving the process information from the client driver 215 suspends the newly created IE browser instance and judges it as a process of interest. User console 216 then starts the injector process 222 to inject the new IE instance with the monitor library DLL 224. Once injection is successful, the user console 216 resumes the suspended IE process.

Upon injection, the monitor library DLL 224, identifies the process where it was injected as a web browser instance. The monitor library DLL 224 hooks itself into IE's API calls for NtCreateFile, NtOpenFile, CreateProcess( ), ShellExecuteEx( )and others. Having detected the host process as a web browser, monitor library DLL 224 activates its URL-NMM 269. The URLNMM 269 of monitor library DLL 224 hooks into URL related APIs like InternetConnect, HttpOpen, InternetCrackURL, and others.

The URLNMM 269 component starts recording and detecting URLs accessed by IE. The URL's are obtained from the current value of the IE address or navigation bar and values obtained from parameters passed in IE's URL related function calls. If a user logs in successfully into his or her email, the URLNMM 269 detects this by the URL (i.e. https://mail.google.com/mail/) and it records the tab where it was opened. Tab identification is done by recording the process ID where the particular tab is running, the thread ID which rendered the tab showing the email, and window handles of the displayed tab, parent window, active window(s), frames and others.

If a user clicks on an attachment and downloads the attachment (i.e. PDF, DOC, EXCEL, files, others), the monit or library DLL 224 detects that an IE tab assigned for email viewing has requested for a file download. Immediately when a new file is created or an old file is overwritten by (the process and threat ID behind) the email tab, the hooks in file creation within the monitor library DLL 224 create metadata/attribute data for that file. The following data is saved as part of the data stream: author application, original file name, logged in user's name, domain name, source URL tag, location data, machine ID, local IP address, host name, first non-system initiator application, and date and time of download.

If a user then clicks on a link in his or her browser, URLNMM 269 checks if the navigate request was executed on the tab where the email content or an email attachment preview was displayed. If the request was done outside of the email tab, URLNMM 269 allows navigation. If the request was done within the email tab, URLNMM 269 checks if the requested URL is whitelisted. If the URL is whitelisted, navigation is allowed but may be recorded. If the URL is not whitelisted, navigation is not allowed and monitor library DLL 224 updates the shared memory map 219 of the flagged navigation request. The injected process, using the monitor library DLL 224, then raises event flags to notify programs monitoring the shared memory map 219.

User console 216, using the core library DLL 220, monitors events raised due to changes in the shared memory map 219. The raised event from the injected process triggers the user console 216 to use core library DLL 220 to read the data in the shared memory map 219. User console 216 then queries the security awareness server 106 for data regarding the URL.

The security awareness server 106 receives the request and records both the URL and the requesting party. The server 106 then gives the user console 216 the requested data including the translated URL. If the security awareness server whitelists the URL, the user console 216 does not prompt the user and opens the URL on the browser as requested. If the server 106 does not whitelist the URL, the user is prompted for further action. If the user decides to proceed, then a new window or tab is launched loading the requested URL. If the user decides not to proceed, no new IE window or tab is opened. The user console 216 updates the server 106 of the action the end user selected.

In some embodiments where extensions or plugins are preferred for browsers, Second Chance can be implemented as a browser extension or plugin 274. This browser extension 274 runs within the browser application and is limited to the constraints set by the browser. One such limitation is the inability of the extension 274 to communicate with the OS and any of its services or programs. To allow OS communication, the SC browser extension 274 invokes BIA 280 to communicate with the OS and its services and programs.

Whenever a user opens an extension-capable web browser 272 such as Chrome, Firefox, EDGE or others, the open browser instance loads all its extensions including the Second Chance extension 274. Once the user logs into his or her browser-based email (for example but not limited to Gmail or Outlook OWA), the Second Chance extension 274 detects the email service provider's URL and gets activated. URL detection or filtering can be done via the extension manifest or background/content script. However, further URL detection and flow control (i.e. redirection and abortion) are provided for by the SC extension's URLNMM 276. In this case however URLNMM 276 is implemented using the provided API's of the web browser maker.

Once the Second Chance extension 274 gets activated, because of a successful email login, it runs an instance of BIA 280. The extension then requests data from the server 106 directly or via the BIA 280 and user console 216. This initial data includes: Second Chance license the computer has registered, some pre-determined list of whitelisted domains for efficient operations, and several configuration data like monitor-only mode, no-prompt on internal domain mode, and others.

If a user clicks on attachment and downloads the attachment (for example, a PDF, DOC, EXCEL file, among others), the Second Chance browser extension 274 detects the file download request via the browser extension downloads API. Second Chance then sends the following information about the downloaded file to the BIA 280: file name created by the browser, the source URL where the file was downloaded from, and the email address of the currently viewed email. BIA 280 receives the request and looks for the file created by the browser. BIA 280 augments the extension provided data with data of its own like: author application, logged in user's name, domain name, location data, machine ID, local IP address, host name, first non-system initiator application, and date and time of download. BIA then creates and saves these attribute data as a coexistent stream (i.e. Alternative Data Stream) to the newly created or overwritten file.

If a user clicks on a link in his or her email, the Second Chance browser extension's URLNMM 276 detects the navigate-to-URL request. The URLNMM 276 then checks its predetermined whitelist. If the URL or domain is included, then SC extension 274 allows navigation. If the URL is not whitelisted, the Second Chance extension 274 sends the URL data and credentials for verification, either directly to the server 106 or to the BIA 280 which sends it to the Second Chance user console 216 and eventually to the server 106.

The server 106 receives the URL, records the request, verifies if the URL is whitelisted, and sends back its results and additional data to the inquiring party. If the request was directly from a browser, then the browser displays a tab asking if the user wants to continue or abort the request. If the request was from the BIA 280 or the user console 216, the user console 216 or BIA 280 show a custom window asking the user if he or she wants to continue or abort. If the end user opts to continue with the URL, then the remote server 106 is informed by his or her decision, and the requested URL is opened. If the end user opts to abort, then the remote server 106 is informed by his or her decision.

Figure 2A:
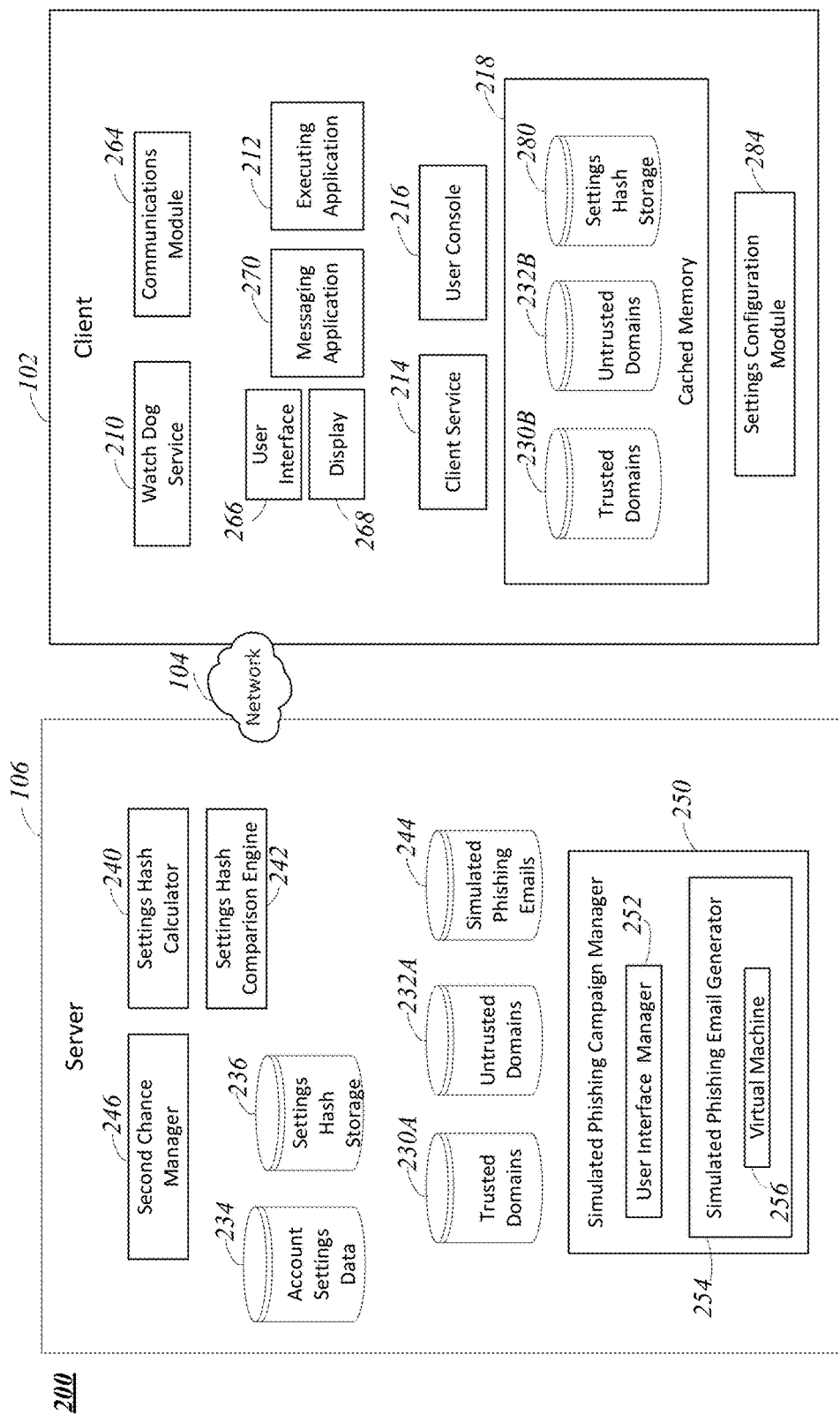
FIG. 2A depicts some of the architecture of an implementation of a system that includes a server, a client device, and a network configured to provide user interfaces based on actions associated with untrusted emails.

Referring to FIG. 2A in a general overview, FIG. 2A depicts some of the architecture of an implementation of a system 200 capable of providing a user interface to confirm whether to review or take an action associated with any of the following: (1) receiving untrusted email (2) connections to untrusted domain from the email and any of its attachments (3) execution of "script", "library", "binary", or "executable" email attachments (4) opening macro enabled attachments (5) opening of dangerous compressed files and their contents.

System 200 includes a server 106. The server 106 includes a second chance manager 246 and a simulated phishing campaign manager 250, which is responsible for executing simulated phishing campaigns. The server 106 includes a settings hash calculator 240 and a settings hash comparison engine 242, which are responsible for creating and validating the settings hash used to efficiently provide altered configuration settings to the client. In some embodiments, the settings hash calculator concatenates all settings values into a long string and then takes a hash of the string and stores this value in the storage on the server. In some embodiments, the settings hash calculator uses an MD5 hash of the concatenated settings values. In some embodiments, the settings hash calculated uses an SHA1 hash of the concatenated settings values. The server 106 includes several storage modules. Trusted domains are stored in storage 230A, untrusted domains are stored in storage 232A, account settings data are in storage 234, settings are stored in storage 236, and simulated phishing emails are stored in storage 244.

Each of the server 106, second chance manager 246, simulated phishing campaign manager 250, user interface manager 252, setting hash calculator 240, settings hash comparison engine 242 and simulated phishing email generator 254 may comprise a program, service, task, script, library, application or any type and form of executable instructions or code executable on one or more processors. Any of the server 106, second chance manager 246, simulated phishing campaign manager 250, user interface manager 252, setting hash calculator 240, settings hash comparison engine 242 and/or simulated phishing email generator 254 may be combined into one or more modules, applications, programs, services, tasks, scripts, libraries, applications, or executable code.

Each of the client 102, watch dog service 210, communications module 264, user interface 266, display 268, messaging application 270, executing application 212, client service 214, settings configuration module 284 and user console 216 may comprise a program, service, task, script, library, application or any type and form of executable instructions or code executable on one or more processors. Any of the client 102, watch dog service 210, communications module 264, user interface 266, display 268, messaging application 270, executing application 212, client service 214, settings configuration module 284, and user console 216 may be combined into one or more modules, applications, programs, services, tasks, scripts, libraries, applications, or executable code.

The simulated phishing campaign manager 250 includes a simulated phishing email generator 254, which may be implemented as or contain a virtual machine 256. The simulated campaign manager 250 also includes a user interface manager 252. Responsive to a user input, the simulated phishing campaign manager 250 generates a campaign for a simulated phishing attack, including one or more selected phishing email templates, one or more selected landing page templates, and one or more selected targeted user groups, in addition to other user input.

In an implementation, system 200 includes a server 106. The server 106 may be a part of a cluster of servers 106. In some embodiments, tasks performed by the server 106 may be performed by a plurality of servers. These tasks may be allocated among the cluster of servers by an application, service, daemon, routine, or other executable logic for task allocation. The server 106 may include a processor and memory.

The simulated phishing campaign manager 250 may manage various aspects of a simulated phishing attack campaign. For example, the simulated phishing campaign manager 250 may process input from the server 106 and/or may provide access as needed to various applications, modules, and other software components of the server 106 to other various applications, modules, and other software components of the server 106. The simulated phishing campaign manager 250 may monitor and control timing of various aspects of a simulated attack campaign, may process requests for access to simulated attack campaign results, and/or may perform other tasks related to the management of a simulated attack campaign.

In some embodiments, the simulated phishing campaign module 250 may be integrated with or coupled to main memory 122. In some embodiments, the main memory 122 may include any type and form of storage, such as a database or file system. The main memory 122 may store data such as parameters and scripts associated with a particular simulated phishing campaign. In an example, the main memory 122 may store a set of parameters and scripts corresponding to the choices made by a server 106 through a simulated phishing campaign manager 250, e.g. as described above for a particular simulated phishing attack.

In an implementation, the simulated phishing campaign manager 250 includes a simulated phishing email generator 254. The simulated phishing email generator 254 may be integrated with or coupled to the main memory 122 so as to provide the simulated phishing email generator 254 accesses to parameters associated with messaging choices made for a particular simulated campaign by e.g. the server 106. The simulated phishing email generator 254 may be integrated with or coupled to memory or a memory store or otherwise a storage, such as a database, containing trusted domains 230A. The simulated phishing email generator 254 may be integrated with or coupled to memory or a memory store or otherwise a storage, such as a database, containing untrusted domains 232A. The simulated phishing email generator 254 may be integrated with or coupled to memory or a memory store or otherwise a storage, such as a database, containing simulated phishing emails 244. The simulated phishing email generator 254 may be an application, service, daemon, routine, or other executable logic for generating messages. The messages generated by the simulated phishing email generator 254 may be of any appropriate format. For example, they may be email messages, text messages, messages used by particular messaging applications such as, e.g., WhatsApp™, or any other type of message. The message type to be used in a particular attack may be selected by e.g. a server 106 using a simulated phishing campaign manager 250. The messages may be generated in any appropriate manner, e.g. by running an instance of an application that generates the desired message type, such as running e.g. a GmailTM application, Microsoft Outlook™, WhatsApp™, a text messaging application, or any other appropriate application. The messages may be generated by running a messaging application on e.g. a virtual machine 256 or may simply be run on an operating system of the server 106, or may be run in any other appropriate environment. The messages may be generated to be formatted consistent with specific messaging platforms, for example Outlook 365, Outlook Web Access (OWA), Webmail, iOS, Gmail client, and so on.

In some embodiments, the simulated phishing email generator 254 can be configured to generate messages having the ability to traverse users who interact with the messages to a specific landing page.

In some embodiments, the simulated phishing email generator 254 can be configured to generate a simulated phishing email. The email can appear to be delivered from a trusted email address, such as the email address of an executive of the company at which the target is employed. In addition, the email can have a "Subject:" field that is intended to cause the user to take an action, such as initiating a wire transfer. In some embodiments, the simulated phishing email generator 254 can generate one or more simulated phishing emails which are stored in the simulated phishing emails storage 244. In some embodiments, the simulated phishing email generator 254 can generate multiple instances of the email which may be delivered to the clients 102 via a network 104. For example, the server 106 can select any number of employees who should be targeted by a simulated attack. The simulated phishing email generator 254 can generate a set of emails similar to the email, each addressed to a respective target identified in the information stored in the memory 122. That is, the simulated phishing email generator 254 can generate the emails such that the "From:" and "Subject:" fields of each email are identical, while the "To:" field is adjusted according to the desired targets.

The second chance manager 246 generally manages the process of sending/receiving data and information between the client 102 and the server 106. For example, the client 102 sends the URL clicked on by the user to server 106 for trusted/untrusted/unknown determination with the results returned to the client 102. The client 102 may additionally send the settings hash that is locally stored on the client to the server 106 with the URL query.

In an implementation, a simulated phishing campaign manager 250 may be e.g., another name for a system administrator, such as a security manager, a third-party security consultant, a risk assessor, or any other party that uses the simulated phishing campaign manager 250 installed on a server 106. The server 106 may wish to direct a simulated phishing attack by interacting with the simulated phishing campaign manager 250 installed on the server 106.

The simulated phishing campaign manager 212 may be, for example, a desktop computer, a laptop computer, a mobile device, or any other suitable computing device. The simulated phishing campaign manager 250 may be e.g., an application on a device that allows for a user of the device to interact with the server 106 for e.g. purposes of creating, configuring, tailoring and/or executing a simulated phishing attack and/or viewing and/or processing and/or analyzing the results of a phishing attack.

In an implementation, the simulated phishing campaign manager 250, when executed, causes a graphical user interface to be displayed to the server 106. In other embodiments, the simulated phishing campaign manager 250 allows for user input through a non-graphical user interface, such as a user interface that accepts text or vocal input without displaying an interactive image. A graphical user interface may be displayed on a screen of a mobile phone, or a monitor connected to a desktop or laptop computer, or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to simulated phishing campaign manager 250, or may be any other type of interface.

In an implementation, the simulated phishing campaign manager 250 and/or server 106 may make choices concerning how a simulated phishing attack is to be carried out. For example, a graphical user interface run by the simulated phishing campaign manager 250 may be displayed to the server 106. A user via the server 106 may input parameters for the attack that affect how it will be carried out. For example, via the server 106 a user may make choices as to which users to include as potential targets in the attack, the method of determining which users are to be selected as targets of the attack, the timing of various aspects of the attack, whether to use an attack template that includes values for one or a plurality of failure indicators, how responses from targeted users should be uniquely identified, and other choices. These choices may be made by selecting options displayed on a graphical user interface from dropdown menus, being presented with choices through a simulated attack wizard, or in any other appropriate manner.

In an implementation, the simulated phishing campaign manager 250 may allow the server 106, such as via application programming interfaces (APIs), to access and/or change settings of an account maintained with any party involved with the attack, such as, for example, a third party security service provider, or may allow the user group management function 212 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the server 106 and any other parties involved in the attack.

The system 200 includes also the client 102. A client 102 may be a target of any simulated phishing attack or actual phishing attack. For example, the client may be an employee, member, or independent contractor working for an organization that is performing a security checkup or conducts ongoing simulated phishing attacks to maintain security. The client 102 may be any device used by the client. The client need not own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some embodiments, the client 102 may further include a user interface 266 such as a keyboard, a mouse, a touch screen, or any other appropriate user interface. This may be a user interface that is e.g. connected directly to a client 102, such as, for example, a keyboard connected to a mobile device, or may be connected indirectly to a client 102, such as, for example, a user interface of a client device 102 used to access a server client 102. The client 102 may include a display 268, such as a screen, a monitor connected to the device in any manner, or any other appropriate display.

In an implementation, the client 102 may include a messaging application 270. The messaging application 270 may be any application capable of viewing, editing, and/or sending messages. For example, the messaging application 270 may be an instance of an application that allows viewing of a desired message type, such as any web browser, a Gmail™ application, Microsoft Outlook™, WhatsApp™, a text messaging application, or any other appropriate application. In some embodiments, the messaging application 270 can be configured to display simulated phishing attack emails. Furthermore, the messaging application 270 can be configured to allow the target to generate reply messages or forwarded messages in response to the messages displayed by the messaging application 270.

In some embodiments, the client 102 may include a communications module 264. This may be a library, application programming interface (API), set of scripts, or any other code that may facilitate communications between the client 102 and any of the server 106, a third-party server, or any other server. In some embodiments, the communications module 264 determines when to transmit information from the client 102 to external servers 106 via a network 104. In some embodiments, the information transmitted by the communications module 264 may correspond to a message, such as an email, generated by the messaging application 270. In some embodiments, the communications module 264 may send request for updated trusted domains 230A and untrusted domains 232A from the server 106 via the network 104.

The client 102 includes the watch dog service 210 and an executing application 212. The watch dog service 210 starts and monitors the client service 214. The watch dog service 210 is launched as a delayed service. Several minutes after all the services start, the delayed services start running. When the watch dog service 210 starts up, it checks to see if the client service 214 is running. If this service is not running, then the watch dog service 210 starts this service. In another aspect, if an end user has advanced privileges and tries to kill the client services 214, the watch dog service 210 will see that the service is not running and it will start it up again. In this way, the watch dog service 210 is a failsafe to ensure that the client service 214 is always running. The watch dog service 210 can also stop the client service 214 or stop and restart the client service 214.

Figure 2B:
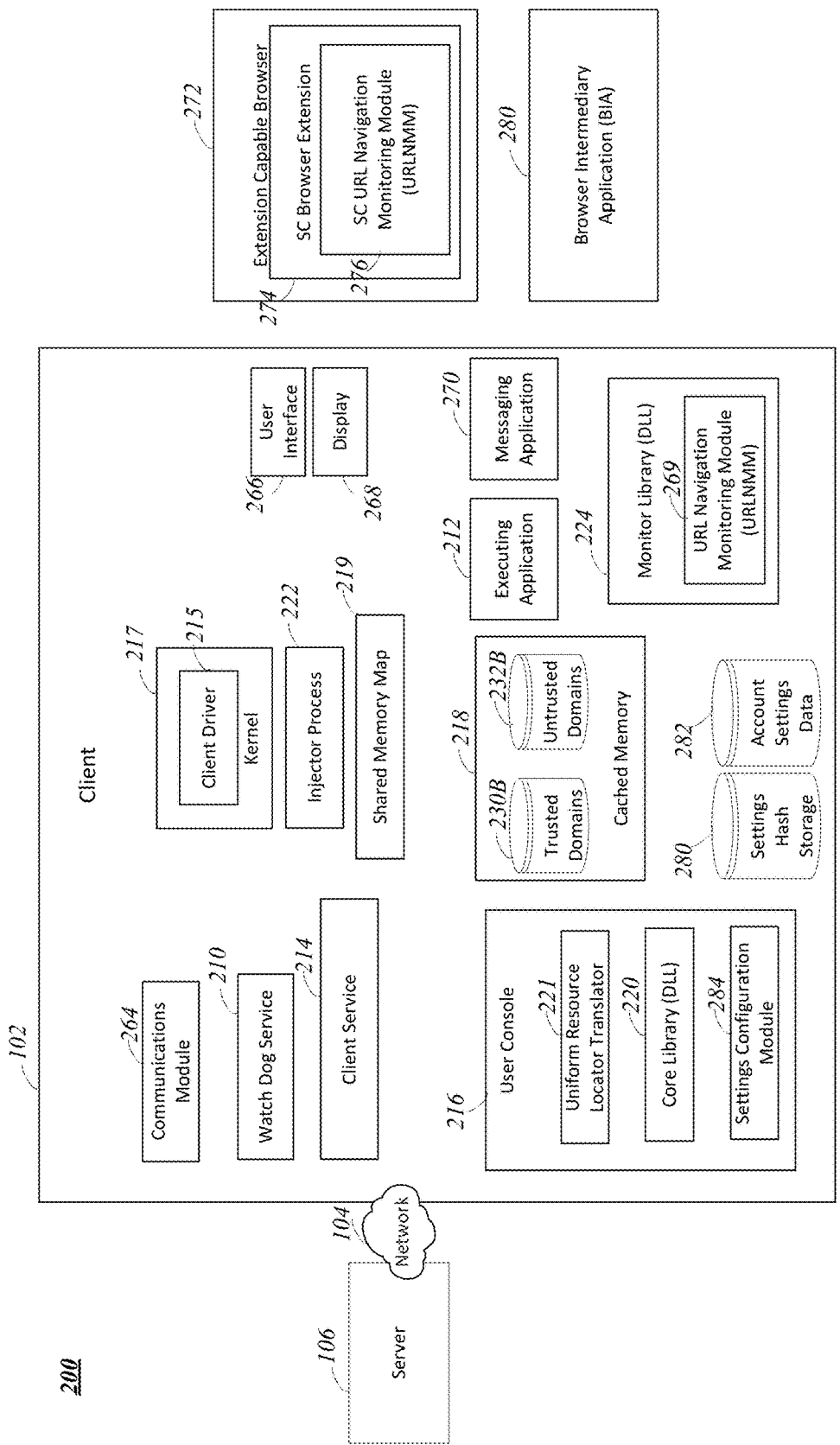
FIG. 2B depicts a detailed view of the architecture of the client device of FIG. 2A with respect to the network and the server of FIG. 2A.

FIG. 2B shows a detailed view of the architecture of the client device 102 with respect to the server 106 via the network 104. Everything shown is configurable.

The client service 214 registers a client driver 215 into the operating system's kernel 217. The client driver is designed to monitor the creation and termination of applications within the operating system. The client service ensures that client driver is installed properly into the operating system. Once the client driver is registered, the client service waits for other critical startup programs to start (like winlogon.exe or explorer.exe in Windows), and then it starts a user console 216. The client service 214 also restarts the user console 216 should it crash or be terminated forcefully.

The client 102 also includes a user console 216. The user console 216 runs in the user space and is responsible for raising a user dialog box to the user. The monitor library 224 pauses execution resulting from the user's action such that the client service 214 temporarily blocks execution of the executing application 212 (i.e., pauses execution of application 212 until the user decides they want to proceed or do not want to proceed) such as temporarily blocking execution of a web browser.

The user console 216, on its creation, loads the core library 220. Via the core library 220, the user console 216 receives messages from client driver 215 whenever a process is created or terminated. Each time the user console 216 receives a message from the client driver 215, it immediately inquires several data from the OS such as the name of the executing application 212, its parameters and its architecture. With these inquired data, the user console 216 then judges whether the executing application 212 is significant or not. If it is insignificant, the user console 216 will ignore it and let it run. Should the executing application 212 be significant (for example messaging applications 270 such as email clients like Outlook, browser-based email clients like Office 365 or Gmail and executing applications 212 such as word processors like MS-WORD), the user console 216 spawns the appropriate injector process 222, to inject the monitor library 224 into the messaging application 270 or the executing application 212. Once the new process loads the monitor library 224, it will now gain access to and use the shared memory map 219 and communications module 264.

The user console 216 tracks the process chain as it runs. For example, in some configurations, it tracks if an instance of MS-WORD (one of the significant executing applications 212) was launched because an end user opened a ".DOC" attachment from a messaging application 270. Since the executing application 212 MS-WORD was directly launched by a messaging application 270, the monitor library 224 injected inside the executing application 212 MS-WORD will be activated to start monitoring, reporting and suspending any URL launches. On the other hand, if none of the MS-WORD processes were launched by a messaging application 270, the e monitor library 224 residing in the executing application 212 MS-WORD will not be activated and MS-WORD will not monitor and report URL launches.

If any of the injected processes report events such as URL launches, the user console 216 receives the message and reacts according to its configuration. The user console includes a uniform resource locator (URL) translator 221. The URL translator 221 may query the URL against its local cache of untrusted domains. If no definitive answer is gained from the local cache, it may connect to the server 106 and query about the URL. If the URL is found to not to be trusted, the user console 216 might display a prompt for the user to either continue the URL launch or discard the launch. The user console 216 may or may not report the user decision to a server 106. This record of user behavior may be used later on to improve training and education.

The user console includes a settings configuration module 284. The company administrator uses the settings configuration module 284 to connect to the server to modify the company's account settings data with respect to notifications. Communication of messages and reporting of events amongst all parts are done via the communications module 264 and the shared memory map 219.

The client 102 also includes a user console 216. The user console 216 runs in the user space and is responsible for raising a user dialog box to the user. The monitor library 224 pauses execution resulting from the user's action such that it temporarily suspends execution of the executing application 212 (i.e., pauses execution of application 212 until the user decides they want to proceed or do not want to proceed) such as temporarily suspending the execution of a web browser.

In some embodiments, the client 102 can optionally include a local cached memory 218 and a shared memory map 219. The shared memory map 219 allows communication between the monitor library 224 within the executing application 212 and/or the messaging application 270, the client driver 215, the user console 216, and the client service 214, all of which have access to the shared memory map 219. The cached memory 218 can include copies of a storage 230B for the trusted domains 230B, a storage 232B for untrusted domains, and storage for the setting hash 280. The storages 230B and 232B can include domains from the server 106 as well as domains identified locally by a client administrator. The contents of cached memory 218 can be copied into the shared memory map 219 for use during runtime.

When the client service 214 detects a URL, via the client driver 215 or via the monitor library 224 that is monitoring the messaging application 270, it writes this URL into shared memory map 219, the user console 216 wakes up and grabs that data and queries, via the lists of trusted and untrusted domains on the shared memory map 219 and on the server 106 to find out if it is a known trusted domain or a known untrusted domain. As described above, the server 106 incorporates two pre-determined domain lists: the trusted domain list 230A and the untrusted domain list 232A. Domain lists are pulled from the server 106 via an API and stored locally to the client 102 in the shared memory map 219 and/or the cached memory 218. For example, the lists stored locally may include trusted domains 230B.

The client service 214 can access the lists stored at the server 106, (i.e. the trusted domain list 230A and the untrusted domain list 232A) by sending a query using an application programming interface (API). The user console 216 can display trusted domains (i.e., websites having domains that are known to be safe—not phishing) and untrusted domains (i.e., websites having domains that are known to be phishing) received from the server 106 (i.e., received from storages 230A and 232A) and can also display trusted domains and untrusted domains from the client administrator locally (i.e., from the cached memory 218 or shared memory map 219). The domains can be viewed and installed on client 102 by way of a web console.

In some embodiments where extensions or plugins are not preferred for browsers, Second Chance can be implemented as injected code similarly to how it works with standalone email client applications (i.e. Outlook). When a user turns on a computer where Second Chance is installed and logs in, the Second Chance user console gets activated and starts receiving data from the client driver 215. Once a user opens an instance of the Internet Explorer (IE) browser, the Second Chance client driver 215 detects the creation of the process and informs the user console 216.

User console 216, upon receiving the process information from the client driver 215 suspends the newly created IE browser instance and judges it as a process of interest. User console 216 then starts the injector process 222 to inject the new IE instance with the monitor library DLL 224. Once injection is successful, the user console 216 resumes the suspended IE process.

Upon injection, the monitor library DLL 224, identifies the process where it was injected as a web browser instance. The monitor library DLL 224 hooks itself into IE's API calls for NtCreateFile, NtOpenFile, CreateProcess( ), ShellExecuteEx( ) and others. Having detected the host process as a web browser, monitor library DLL 224 activates its URLNMM 269. The URLNMM 269 of monitor library DLL 224 hooks into URL related APIs like InternetConnect, HttpOpen, InternetCrackURL, and others.

The URLNMM 269 component starts recording and detecting URLs accessed by IE. The URL's are obtained from the current value of the IE address or navigation bar and values obtained from parameters passed in IE's URL related function calls. If a user logs in successfully into his or her email, the URLNMM 269 detects this by the URL (i.e. https://mail.google.com/mail/) and it records the tab where it was opened. Tab identification is done by recording the process ID where the particular tab is running, the thread ID which rendered the tab showing the email, and window handles of the displayed tab, parent window, active window (s), frames and others.

If a user clicks on an attachment and downloads the attachment (i.e. PDF, DOC, EXCEL, files, others), the monitor library DLL 224 detects that an IE tab assigned for email viewing has requested for a file download. Immediately when a new file is created, or an old file is overwritten by (the process and threat ID behind) the email tab, the hooks in file creation within the monitor library DLL 224 create metadata/attribute data for that file. The following data is saved as part of the data stream: author application, original file name, logged in user's name, domain name, source URL tag, location data, machine ID, local IP address, host name, first non-system initiator application, and date and time of download.

If a user then clicks on a link in his or her browser, URLNMM 269 checks if the navigate request was executed on the tab where the email content or an email attachment preview was displayed. If the request was done outside of the email tab, URLNMM 269 allows navigation. If the request was done within the email tab, URLNMM 269 checks if the requested URL is whitelisted. If the URL is whitelisted, navigation is allowed but may be recorded. If the URL is not whitelisted, navigation is not allowed and monitor library DLL 224 updates the shared memory map 219 of the flagged navigation request. The injected process, using the monitor library DLL 224, then raises event flags to notify programs monitoring the shared memory map 219.

User console 216, using the core library DLL 220, monitors events raised due to changes in the shared memory map 219. The raised event from the injected process triggers the user console 216 to use core library DLL 220 to read the data in the shared memory map 219. User console 216 then queries the security awareness server 106 for data regarding the URL.

The security awareness server 106 receives the request and records both the URL and the requesting party. The server 106 then gives the user console 216 the requested data including the translated URL. If the security awareness server whitelists the URL, the user console 216 does not prompt the user and opens the URL on the browser as requested. If the server 106 does not whitelist the URL, the user is prompted for further action. If the user decides to proceed, then a new window or tab is launched loading the requested URL. If the user decides not to proceed, no new IE window or tab is opened. The user console 216 updates the server 106 of the action the end user selected.

In some embodiments where extensions or plugins are preferred for browsers, Second Chance can be implemented as a browser extension or plugin 274. This browser extension 274 runs within the browser application and is limited to the constraints set by the browser. One such limitation is the inability of the extension 274 to communicate with the OS and any of its services or programs. To allow OS communication, the SC browser extension 274 invokes BIA 280 to communicate with the OS and its services and programs.

Whenever a user opens an extension-capable web browser 272 such as Chrome, Firefox, EDGE or others, the open browser instance loads all its extensions including the Second Chance extension 274. Once the user logs into his or her browser-based email (for example but not limited to Gmail or Outlook OWA), the Second Chance extension 274 detects the email service provider's URL and gets activated. URL detection or filtering can be done via the extension manifest or background/content script. However, further URL detection and flow control (i.e. redirection and abortion) are provided for by the SC extension's URLNMM 276. In this case however URLNMM 276 is implemented using the provided API's of the web browser maker.

Once the Second Chance extension 274 gets activated, because of a successful email login, it runs an instance of BIA 280. The extension then requests data from the server 106 directly or via the BIA 280 and user console 216. This initial data includes: Second Chance license the computer has registered, some pre-determined list of whitelisted domains for efficient operations, and several configuration data like monitor-only mode, no-prompt on internal domain mode, and others.

If a user clicks on attachment and downloads the attachment (for example, a PDF, DOC, EXCEL file, among others), the Second Chance browser extension 274 detects the file download request via the browser extension downloads API. Second Chance then sends the following information about the downloaded file to the BIA 280: file name created by the browser, the source URL where the file was downloaded from, and the email address of the currently viewed email. BIA 280 receives the request and looks for the file created by the browser. BIA 280 augments the extension provided data with data of its own like: author application, logged in user's name, domain name, location data, machine ID, local IP address, host name, first non-system initiator application, and date and time of download. BIA then creates and saves these attribute data as a coexistent stream (Alternative Data Stream) to the newly created or overwritten file.

If a user clicks on a link in his or her email, the Second Chance browser extension's URLNMM 276 detects the navigate-to-URL request. The URLNMM 276 then checks its predetermined whitelist. If the URL or domain is included, then SC extension 274 allows navigation. If the URL is not whitelisted, the Second Chance extension 274 sends the URL data and credentials for verification, either directly to the server 106 or to the BIA 280 which sends it to the Second Chance user console 216 and eventually to the server 106.

The server 106 receives the URL, records the request, verifies if the URL is whitelisted, and sends back its results and additional data to the inquiring party. If the request was directly from a browser, then the browser displays a tab asking if the user wants to continue or abort the request. If the request was from the BIA 280 or the user console 216, the user console 216 or BIA 280 show a custom window asking the user if he or she wants to continue or abort. If the end user opts to continue with the URL, then the remote server 106 is informed by his or her decision, and the requested URL is opened. If the end user opts to abort, then the remote server 106 is informed by his or her decision.

In some embodiments, the server 106 includes a simulated phishing campaign manager 250. This simulated phishing campaign manager 250 analyzes which phishing email templates are most effective in generating user failures when the template is used in a simulated phishing attack. The simulated phishing campaign manager 250 additionally determines what the most common failure types are for a given template. The simulated phishing campaign manager 250 may perform additional analysis across many different templates used to determine which failure indicators lead to the highest rate of failures.

For example, the simulated phishing campaign manager 250 may include data collected from targets, records of failures such as a listing of which targets replied to a simulated phishing email, systemic or other security measures in place during the simulated phishing attacks, time or date logs, user identifiers, data detailing the results or analysis of attack results including data that indicates associations between attack results, and any other appropriate data. The server 106 may view, save, share, print, or perform any other appropriate action with the attack results. The simulated phishing campaign manager 250 may perform analysis on the attack results, possibly upon request of the server 106. For example, this analysis may include determining which users are a security risk based on having a number of failures above a predetermined threshold, whether certain security systems in place are effective by e.g. correlating the presence of such security systems with a lower than average incidence of failures. The simulated phishing campaign manager 250 may allow an attack manager to view, on a graphical user interface run by the second chance manager 246, such as for example a timeline of overall failure rates, which may be useful in helping to determine whether a security policy that was instituted at a particular time was effective in improving security.

In some embodiments, reply emails sent from the client 102 to the server 106 can be processed by the simulated phishing campaign manager 250. For example, simulated phishing campaign manager 250 can be configured to process reply emails received from one or more target clients 102 to determine the identities of the targets who sent the reply emails. In some embodiments, the identities of the targets may be determined based in part on the unique identifiers included within each reply email received by the server 106.

The system 200 may include a network 104. The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network. The network 104 connects the server 106 and a client 102. The client 102 comprises a communications module 264, a user interface 266, a display 268, a messaging application 270, and a memory such as any embodiments of main memory 122 described herein or any type and form of storage, such as a database or file system. The client 102 receives the email sent by the server 106 based upon the campaign created and executed by the simulated phishing campaign manager 250. The client 102 is able to receive the simulated phishing email via the messaging application 270, display the received email for the user using the display 268, and is able to accept user interaction via the user interface 266 responsive to the displayed email. If the user interacts with the simulated phishing email, the client 102 traverses to a landing page or display used by the simulated phishing campaign manager 250 in the phishing campaign.

As shown in FIG. 2B, the watch dog service 210 starts and monitors the client service 214. The client service 214 obtains licensing information from the server 106 via the network 104. The client service 214 and the user console 216 both communicate to the network via an API. The API is a private API, and a license key is required to use the API. The license key is included in each request in order to identify the party responsible for service requests. The API is a REST API that uses a simple key based authentication. For the purpose of the API, the license key may be referred to as "authentication_token" or "auth_token" and must be provided with all requests. The "Return Values" table shows different parameters returned from the server. For example, "Admin known status"—customer account lists known good, known bad, or unknown. As shown in the following tables, "KB4_known_status" can return the same three statuses: known good, known bad, or unknown. If the client returns unknown for a domain and the server returns known (good or bad) for the same domain, the server can decide whether or not to prompt the client. However, where there is a conflict between the client returning a untrusted domain blacklisted and the server returning the same domain as trusted, the client overrides the server such that the domain is blacklisted.

Various factors such as box text, box colors, etc. are all customizable so that the end user is provided a client system that is customized for their company.

There are several required parameters that may be set or established to use the API in addition to the license key or authentication token as follows:

| Parameter | Description |
| --- | --- |
| sc_version | The version of the currently installed second chance system |
| os_name | Operating system name |
| os_version | Operating system version |
| os_architecture | Operating system architecture x32/x64 |
| os_locale | Operating system locale (numeric format) |
| outlook_version | Messaging application/email client version |
| machine_guid | Unique machine ID generated by the second chance system |

There are several available APIs as follows:

Installed

This API is used to indicate the fact that second chance was installed. This should be called every time second chance is installed on an individual computer.

Method: POST

Path: /v1/sc/installed

Parameters: Only the required parameters above

Response Code: 201

Response Body: JSON response echoing required parameters

```
{
    "data":{
        "sc_version":"1",
        "machine_guid":"1",
        "os_architecture":"1",
        "os_locale":"1",
        "os_name":"1",
        "outlook version":"1",
    }
}
```

Uninstalled

This API is used to indicate the fact that second chance was uninstalled. This should be called every time second chance is uninstalled on an individual computer.

Method: POST

Path: /v1/sc/uninstalled

Parameters: Only the required parameters above

Response Code: 201

Response Body: JSON response echoing required parameters

```
{
    "data":{
        "sc_version":"1",
        "machine_guid":"1",
        "os_architecture":"1",
        "os_locale":"1",
        "os_name":"1",
        "outlook version":"1",
    }
}
```

Service Start

This API is used to indicate the fact that second chance was started on a computer. This should be called every time second chance starts on an individual computer.

Return values

| Parameter | Description |
| --- | --- |
| linktitlebar_text | Text to use in prompt title bar for link clicked |
| linkmessageheader_text | Message header for prompt for link clicked |
| info_link | Currently left empty, later will return a URL to make available on prompt to help educate user |
| info_link_ext | Text used for link in message |
| info_link_visible | Boolean: is info link visible. Default is false |
| allow_button_text | Text for allow button |
| allow_button_fgcolor | Fore color for allow button |
| allow_button_bgcolor | Back color for allow button |
| allow_button_visible | Boolean: is allow button visible. Default is true |
| tbt_button_text | Text for turn back time button |
| tbt_button_fgcolor | Fore color for turn back time button |
| tbt_button_bgcolor | Back color for turn back time button |
| remember_cb_visible | Boolean: is the "Remember" checkbox visible. This will only appear if the allow button is visible. Default is false |
| show_prompt_enum | Value that determines if prompts are raised<br>0 = Do not show prompts, record data only<br>1 = Show prompts for known untrusted only<br>2 = Show prompts for both known untrusted and unknown<br>3 = Show prompts for all links clicked |

Method: POST

Path: /v1/sc/service_start

Parameters: Only the required parameters above

Response Code: 201

Response Body: JSON response containing the current second chance settings.

```
{
    "data":{
        "linktitlebar_text":"1",
        "linkmessageheader_text":"1",
        "info_link":"1",
        "info_link_text":"1",
        "info_link_visible":"1",
        "allow_button_text":"1",
        "allow_button_fgcolor":"1",
        "allow_button_bgcolor":"1",
        "allow_button_visible":"1",
        "tbt_button_text":"1",
        "tbt_button_fgcolor":"1",
        "tbt_button_bgcolor":"1",
        "remember_cb_visible":"1",
        "show_prompt_enum":"1",
    }
}
```

Validate URL

This API is used to validate a URL against the administrator defined list and the database. This should be called every time second chance raises an event that a ShellExecEX( )is opening a URL.

Additional Outgoing values

| Parameter | Description |
| --- | --- |
| URL | Full URL user is attempting to open |

Return values

| Parameter | Description |
|---|---|
| Domain | Domain parsed from original URL |
| Admin_known_status | 0 = Unknown<br>1 = Known Trusted<br>2 = Known Untrusted |
| Service_known_status | 0 = Unknown<br>1 = Known Trusted<br>2 = Known Untrusted |
| info_link | Currently left empty, later will return a URL to make available on prompt to help educate user |
| Info_link_text | Text for link end user will see if visible |
| info_link_visible | Boolean: is info link visible. Default is false |
| linktitlebar_text | Text to use in prompt title bar for link clicked |
| Linkmessageheader_text | Message header for prompt for link clicked |
| allow_button_text | Text for allow button |
| allow_button_fgcolor | Fore color for allow button |
| allow_button_bgcolor | Back color for allow button |
| allow_button_visible | Boolean: is allow button visible. Default is true |
| tbt_button_text | Text for turn back time button |
| tbt_button_fgcolor | Fore color for turn back time button |
| tbt_button_bgcolor | Back color for turn back time button |
| remember_cb_visible | Boolean: is the "Remember" checkbox visible. This will only appear if the allow button is visible. Default is false |
| show_prompt_enum | Value that determines if prompts are raised<br>0 = Do not show prompts, record data only<br>1 = Show prompts for known untrusted only<br>2 = Show prompts for both known untrusted and unknown<br>3 = Show prompts for all links clicked |

Method: POST

Path: /v1/sc/validate_URL

Parameters: Only the required parameters above

Response Code: 201

Response Body: JSON response containing the current second chance settings.

```
{
    "data":{
        "domain":"1",
        "admin_known_status":"1",
        "service_known_status":"1",
        "info_link":"1",
        "info_link_text":"1",
        "info_link_visible":"1",
        "linktitlebar_text":"1",
        "linkmessageheader_text":"1",
        "allow_button_text":"1",
        "allow_button_fgcolor":"1",
        "allow_button_bgcolor":"1",
        "allow_button_visible":"1",
        "tbt_button_text":"1",
        "tbt_button_fgcolor":"1",
        "tbt_button_bgcolor":"1",
        "remember_cb_visible":"1",
        "show_prompt_enum":"1",
    }
}
```

Action Taken

This API is used to validate a URL against the administrator defined list and the database. This should be called every time second chance raises an event that a ShellExecEX( ) is opening a URL.

Additional Outgoing values

| Parameter | Description |
|---|---|
| URL | Full URL user is attempting to open |
| Domain | Domain parsed from the original URL |
| Admin_known_status | Value stating AUK status from lookup of domain<br>0 = Unknown<br>1 = Known trusted<br>2 = Known untrusted |
| Service_known_status | 0 = Unknown<br>1 = Known trusted<br>2 = Known untrusted |
| User_known_status | 0 = Unknown<br>1 = Known trusted<br>2 = Known untrusted |
| Action_taken_enum | Action taken enum values<br>0 = Unknown<br>1 = Admin known trusted URL (Auto allowed)<br>2 = User known trusted URL (Auto allowed, can only happen if URL is admin unknown)<br>3 = Service known trusted URL (Auto allowed, can only happen if URL is both user and admin unknown)<br>4 = Admin known untrusted URL (prompted)<br>5 = Service known untrusted URL (prompted, can only happen if URL is both user and admin unknown)<br>6 = Manually continued to site<br>7 = Manually aborted navigation to site |
| Info_link | Currently left empty, later will return a URL to make available on prompt to help educate user |
| Info_link_text | Text for link end user will see if visible |
| Info_link_visible | Boolean: is info link visible. Default is false |
| Linkmessageheader_text | Message header for prompt for link clicked |
| Viewed_info_link | Boolean: did the user view the information link returned? Default is False |

Return values

| Parameter | Description |
|---|---|
| None | |

Method: POST

Path: /v1/sc/action_taken

Parameters: Only the required parameters above

Response Code: 201

Response Body: JSON response containing the current second chance settings.

```
{
    "data":{
        "domain":"1",
        "admin_known_status":"1",
        "service_known_status":"1",
        "info_link":"1",
        "info_link_text":"1",
        "info_link_visible":"1",
        "linktitlebar_text":"1",
        "linkmessageheader_text":"1",
        "allow_button_text":"1",
        "allow_button_fgcolor":"1",
        "allow_button_bgcolor":"1",
        "allow_button_visible":"1",
        "tbt_button_text":"1",
        "tbt_button_fgcolor":"1",
```

```
            "tbt_button_bgcolor":"1",
            "remember_cb_visible":"1",
            "show_prompt_enum":"1",
        }
    }
```

On initiation of the client on the server, all notifications are set to the default notifications and are stored in the account settings data storage 234. The server settings hash is calculated and stored in the settings hash storage 236. In some embodiments, the settings hash is calculated by concatenating all settings values into a string and then taking a hash of the string. In some embodiments, an MD5 hash is taken of the concatenated settings values to create the settings hash. In some embodiments, the SHA 1 hash is taken of the concatenated settings values to create the settings hash. The settings hash may be stored in memory cache on the server 106 to enable fast access and look up. In some embodiments, the settings hash is also stored in a database on the server 106 or in memory 122 on the server 106 such that it is persistent and can be re-cached on the server 106 in the event of any server restarts. In some embodiments, when a client is initiated, software for the client is installed on the server 106. When the client is installed, the client sends it license to the server 106 to be validated.

The first time that the client 102 sends a query to the server 106 for disposition of a URL, the client also sends the settings hash. On this initial call, the settings hash will be empty since the server 106 has not yet sent a settings hash or any settings to the client 102. When the server 106 receives the first disposition query with an empty settings hash, the settings hash comparison engine 242 will compare the empty settings hash from the client 102 to the server settings hash from the settings hash cache storage 236, and there will be a mismatch. Accordingly, this initial disposition call to the server 106 API will always result in the server returning the response to the query along with the values of the plurality of settings for this company from the account settings data storage 234 along with the settings hash of the values of the plurality of settings for this company, which was previously calculated by the settings hash calculator 240 and stored in the settings hash storage 236. The client stores the plurality of settings in the local account settings data storage 282 and stores the settings hash in the local settings hash storage 280.

On subsequent queries or calls to the server 106 for disposition, the client transmits the client settings hash from the settings hash storage 280, which contains the last known settings hash for the client. If the client settings hash matches the server settings hash on the server 106, then this means that the settings for this client have not been updated since the last query to the server, and no settings data or settings hash are returned by the server 106 to the client 102 with the results of the query, and the client uses the local copy of the account settings data 282 to generate the notification for the user. If the client settings hash does not match the server settings hash, then the query returns the current account settings data 234 from the server 106 along with the current server settings hash 236. When the client receives the account settings data and the settings hash, it stores these in local memory. This process insures that the client always uses the most recent changes made to the client settings by the client administrator using the settings configuration module 284 by validating the client settings hash against the server settings hash and providing updated settings if the hashes don't match. The present invention also insures that the settings are only transmitting to the client on an as-needed basis. If the client account settings are up to date based on the hash value comparison, the client uses the locally cached account settings data 282 rather than the server having to send account settings data for every URL query it receives from the client. The client also has a "Check" API, which is called once per day to insure the client's license is still valid and to validate the settings has in case the client incurs any off-line time and needs to raise notifications using the latest setting.

Examples of an implementation of the API is as follows:

```
• rpc Check(CheckRequest) returns (CheckReply) { }
Check Consist of the following:
Message CheckRequest {
        uint32 endpointID = 1;          // Unique numeric identifier assigned to the client
during product registration
        string settingsEtag = 2;        // Hash of Setting values.
}
// The response message containing the unregistration response
message CheckReply {
        uint32 endpointID = 1;          // Unique numeric identifier assigned to the client
during product registration
        string message = 2;             // Contains a message if the license is no longer valid
and SecondChance should uninstall itself. (Not pertinent to Dynamic Messages).
        Settings settings = 3;          // Updated settings if the Settings Hash did not match
the value on the server, otherwise null
        string settingsEtag = 4;        // Update Settings Hash if the one sent in did not match
the value on the server, otherwise null
}
        • rpc Disposition(DispositionRequest) returns (DispositionReply) { }
// The response message containing the URL disposition response
message DispositionReply {
        URLInfo urlInfo = 1;            // Defined below
        Disposition adminDisposition = 2;       //Contains Admin specific Disposition Enum
for URL in question
        Disposition kb4Disposition = 3;         //Contains KB4 specific Disposition Enum
for URL in question.
```

```
        Settings settings = 4;              // Updated settings if the Settings Hash did not match
the value on the server, otherwise null
        string settingsEtag = 5;             // Update Settings Hash if the one sent in did not match
the value on the server, otherwise null
    }
// Contains detailed information about the URL sent in for Dispositioning.
        message URLInfo {
            string scheme = 1;               // http:// https://, ...
            string host = 2;                 // host or domain for the URL. Ie: msn.com
            string path = 3;                 // Any additional path info after the host, before the
query.
            string query = 4;                // Query string if it exists.
            string md5 = 5;                  // MD5 of the full URL
            string sha256 = 6;               // SHA256 of the full URL
        }
// Enumeration of possible Disposition Responses
enum Disposition {
    UNKNOWN = 0;
    KNOWN_GOOD = 1;
    KNOWN_BAD = 2;
}
        // post the action taken by the user when given a second chance
                • rpc PostAction(PostActionRequest) returns (Empty) { }
message PostActionRequest {
        string url = 1;                      // URL on which the prompt was raised.
        Disposition adminDisposition = 2;    //Contains Admin specific Disposition Enum
for URL in question
        Disposition kb4Disposition = 3;      //Contains KB4 specific Disposition Enum
for URL in question.
        Disposition userDisposition = 4;     //Contains what the end-user actually did
when presented with the prompt.
        enum ActionTaken {
            NONE = 0;
            ADMIN_KNOWN_GOOD = 1;
            KB4_KNOWN_GOOD = 2;
            USER_KNOWN_GOOD = 3;
            ADMIN_KNOWN_BAD = 4;
            KB4_KNOWN_BAD = 5;
            CONTINUED = 6;
            ABORTED = 7;
        }
        ActionTaken actionTaken = 5;
}
```

An example of the database schema for the backend database in one implementation is as follows:

```
secondchance_dev=# \d accounts
                    Table "public.accounts"
   Column   |           Type              |          Modifiers
------------+-----------------------------+-----------------------------------------------------
 id         | integer                     | not null default nextval('accounts_id_seq'::regclass)
 created_at | timestamp without time zone | not null
 updated_at | timestamp without time zone | not null
 name       | character varying           |
Indexes:
    "accounts_pkey" PRIMARY KEY, btree (id)
secondchance_dev=# \d domains
                    Table "public.domains"
   Column   |           Type            |          Modifiers
------------+---------------------------+-----------------------------------------------------
 id         | integer                   | not null default nextval('accounts_id_seq'::regclass)
 name       | character varying         |
 deleted_at | timestamp with time zone  |
 created_at | timestamp with time zone  |
 updated_at | timestamp with time zone  |
Indexes:
    "domains_pkey" PRIMARY KEY, btree (id)
secondchance_dev=# \d account_domains
                    Table "public.account_domains"
   Column   |     Type      |          Modifiers
------------+---------------+-----------------------------------------------------
 id         | integer       | not null default nextval('account_domains_id_seq'::regclass)
```

```
account_id   | integer     |
domain_id    | integer     |
prompt       | boolean     |
deleted_at   | timestamp with time zone |
created_at   | timestamp with time zone |
updated_at   | timestamp with time zone |
Indexes:
    "account_domains_pkey" PRIMARY KEY, btree (id)
    "index_account_domains_on_account_id" btree (account_id)
    "index_account_domains_on_domain_id" btree (domain_id)
```

An example of the account setting data as it is stored on the server is as follows. The text fields and buttons support variable length text, and each has a default value:

```
settings := &rpc.Settings{
    BadMessageBannerText: &rpc.Settings_Component{
        Text: "Second Chance Warning!",
    },
    BadMessagePromptText: &rpc.Settings_Component{
        Text: "This is a known bad URL, are you REALLY sure want to proceed with opening the link below?",
    },
    BadPunycodeText: &rpc.Settings_Component{
        Text: "This is a dangerous link pretending to be to:",
    },
    BadReversePunycodeText: &rpc.Settings_Component{
        Text: "This is a dangerous link actually going to:",
    },
    BadRememberCheckBox: &rpc.Settings_Component{
        Text:    "Remember!",
        Visible: false,
    },
    BadInfoLink: &rpc.Settings_Component{
        Url:     "http://www.knowbe4.com",
        Text:    "Learn more...",
        Visible: false,
    },
    BadAllowButton: &rpc.Settings_Component{
        Text:            "Yes, I live on the edge!",
        ForegroundColor: "Black",
        BackgroundColor: "Orange",
        Visible:         true,
    },
    BadTurnBackTimeButton: &rpc.Settings_Component{
        Text:            "No, I like my job.",
        ForegroundColor: "Black",
        BackgroundColor: "Red",
    },
    UnkMessageBannerText: &rpc.Settings_Component{
        Text: "Second Chance Alert!",
    },
    UnkMessagePromptText: &rpc.Settings_Component{
        Text: "Do you want to proceed with opening the link below?",
    },
    UnkPunycodeText: &rpc.Settings_Component{
        Text: "This is a potentially dangerous link pretending to be to:",
    },
    UnkReversePunycodeText: &rpc.Settings_Component{
        Text: "This is a potentially dangerous link actually going to:",
    },
    UnkRememberCheckBox: &rpc.Settings_Component{
        Text:    "Remember!",
        Visible: false,
    },
    UnkInfoLink: &rpc.Settings_Component{
        Url:     "http://www.knowbe4.com",
        Text:    "Learn more...",
        Visible: false,
    },
    UnkAllowButton: &rpc.Settings_Component{
        Text:            "Yes",
        ForegroundColor: "Black",
        BackgroundColor: "Orange",
        Visible:         true,
    },
    UnkTurnBackTimeButton: &rpc.Settings_Component{
        Text:            "No",
        ForegroundColor: "Black",
        BackgroundColor: "Red",
    },
    ShowPromptOptions: 2,
    ClientProxy: &rpc.Settings_ClientProxy{
        Url:  "",
        Port: "",
    },
}
```

The server 106 stores lists of domains. One example is a domain list of domains that are known to be problematic or risky and are therefore untrusted domains 232A. One example is a domain list of domains that are considered to be safe and are therefore trusted domains 230A. There may be lists of both trusted and untrusted domains as part of 230A and 232A that are specific to the service provider. There may be lists of both trusted and untrusted domains that are specific to the client and which are sent via the API from the client service 214 to the server 106 via the network 104. The trusted domains 230A and untrusted domains 232A may be sent to the client in order to be stored in the cached memory 218 as trusted domains 230B and untrusted domains 232B, as well as in the shared memory map 219. Lists of trusted domains and untrusted domains that are set up by the client administrator take precedence over lists of trusted domains and untrusted domains that are specific to the server 106. Domains which are unknown, that is domains that are not in any lists, are considered potentially problematic and the user may be prompted by the user console 216. The messaging in the prompt sent to the user via the user console 216 may be different for a unknown domain than for an untrusted domain.

The client service 214 is not associated with the user but is running in the background on the client all the time when started by the watch dog service 210. The client service 214 interacts with the user console 216 which runs in the user space allowing the service to pop up messages that target the user with dialogs. The client service 214 ensures that the second chance product is licensed, which enables the service to identify the end user and what company they belong to. This knowledge may enable the server 106 to control the configuration data that the client service 214 receives and how the user console 216 behaves, for example with regards to messaging the user.

The client service 214 also starts a user console 216 for every user that logs into a user profile. There may be several instances of the user console 216 for every logged in user. The client service 214 is a separate component that monitors and can in some instances control the user console 216 when initiated (e.g., initiate pop up messages that temporary pause execution of an application, such as pausing execution of a web browser).

The user console 216 runs in the user space of the operating system. It raises prompts, get replies, and takes care of everything that needs to be done interactively with the user. The user console 216 is equipped with an internal library, the core library 220, which allows it to detect processes being created or terminated by the operating system. Whenever the OS creates a process, the user console detects it and determines if it is significant or not. Should it be significant, the user console invokes the injector process 222 to inject the monitor library 224 on the detected process. Using the monitor library 224, the user console 216 also gains access to a communication module 264, one or more shared memory maps 219, event flags and queues. The user console 216 receives messages like a request for URL access from the processes injected with the monitor library 224. Depending on the message from injected processes, the user console 216 displays a prompt on the display 268 and waits for user response. It then forwards the user response to the monitor library 224 waiting for permission to open a URL or an attachment. To determine whether a URL is trusted or not, the user console 216 can interact with either the client service 214, the server 106 or can query a shared memory map 219 list of domains. Also the user console 216 can connect with the client service 214 for its settings.

A monitor library 224 writes data or information to the shared memory map 219. The monitor library 224 also monitors the messaging application 270 (e.g., email service such as Outlook).

If the user console 216 determines that the messaging application 270 or the executing application 212 needs to be injected with a process in order to monitor for user activity, then the user console 216 spawns an injector process 222. The user console may spawn either a 32 bit or a 64 bit injector process 222. The injector process 222 then injects a monitor library 224, again either 32 bit or 64 bit, into processes of the executing application 212 or the messaging application 270. The injected monitor library 224 monitors processes of messaging application 270 (e.g., Outlook) and/or executing application 212 (e.g.,Word, Adobe pdf). For example, the injector process 222 can inject the monitor library 224 into executing application 212 (e.g., MS word) to detect if the executing application 212 opens a website link.

In one implementation, the system 200 uses process tree monitoring. This type of process includes modules that monitor and track user actions such as clicking on links in emails as well as opening files attached to emails and then clicking on links in the attached files from the email. For example, tracking the messaging application 270 can include tracking opening of a file explorer e.g., track a user that opens a zip file then opens a word document in zip file and then clicks on the link in the word document.

When the monitor library 224 detects that a URL is being accessed, it writes the name of the URL into a shared memory map 219 and raises a flag or an event. The user console 216 being linked with the core library 220, detects the raised flag or event and grabs information written on the shared memory map 219 (e.g. the URL). When the user console 216 detects the flag or event, it uses the uniform resource locator translator 221 to resolve any URL in Punycode, tinyURL and/or other formats into their true form. It may or may not query the shared memory map 219 to determine if the URL is part of the local known trusted domains 230B or known untrusted domains 232B. If the URL is not part of either of these lists, the user console 216 may make a query to the server 106 via the API, to see if the URL is part of the server known trusted domains 230A or the server known untrusted domains 232A, or whether the URL represents an unknown domain.

As appreciated by one of skill in the art, other methods may be used to track clicking links and other search methods may be used for finding phishing related documents. For example, the system 200 may look to metadata for determining whether domains and/or documents are suspect (e.g., where domains are within documents attached to emails). The metadata provides the document's heritage which can be used for determining whether document is suspect.

The "Action Taken" table shows what the server records regarding actions taken by user as recorded by "action_taken_enum" (e.g., user continued to website or user aborted navigation to website). The server records and uses this information later (e.g., to track the user's performance). In one example, the system 200 only triggers a pop up box when there is an internet connection about to occur (e.g., opening website link).

In other implementations, the system 200 can also monitor common messaging platforms (e.g., skype links, jabber, google hangout). Other possible triggers could be: open file, reply to phishing email, etc.

Figure 3A:
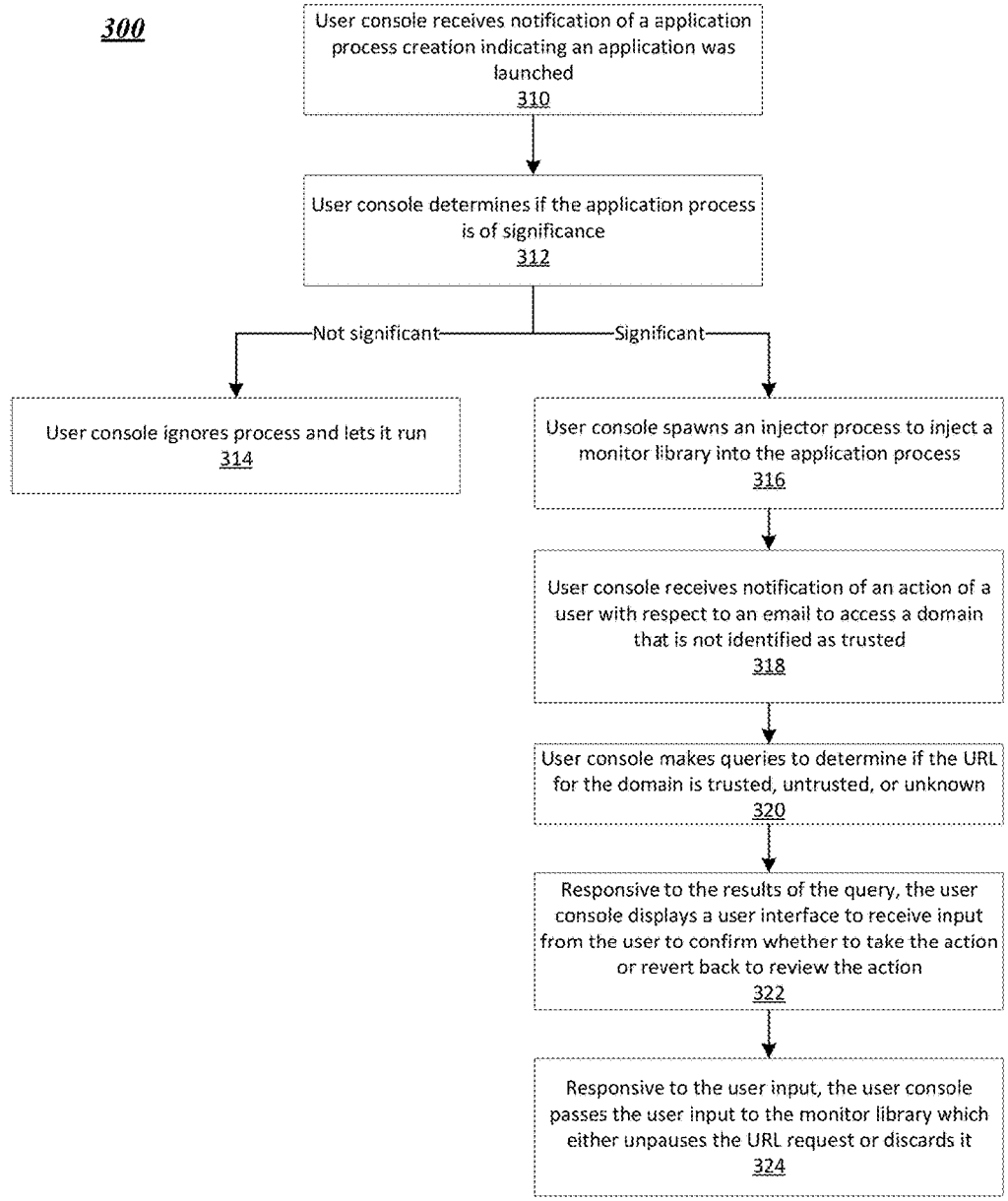
FIG. 3A depicts an implementation of a method for providing a prompt to confirm whether to review or take an action associated with an untrusted email; the prompt using updated values of one or more of a plurality of settings.

Referring to FIG. 3A in a general overview, FIG. 3A depicts an implementation of a method 300 for providing a user interface to confirm whether to review or take an action associated with an untrusted email. In step 310, the user console receives notification of an application process creation indicating that an application was launched. In step 312, responsive to receiving notification, the user console determines if the application process is of significance. If the application process is not significant, then in Step 314, the user console ignores the process and lets it run. If the application process is significant, then in Step 316, the user console spawns an injector process to inject a monitor library into the application process. In Step 318, the user console receives notification of an action of a user with respect to an email to access a domain that is not identified as trusted. In Step 320, the user console makes queries to determine if the URL for the domain is trusted, untrusted or unknown. Responsive to the results of the query, in Step 322, the user console displays a user interface to receive input from the user to confirm whether to take the action or revert back to review the action. In Step 324, responsive to the user input, the user console passes the user input to the monitor library which either unpauses the URL request or discards it.

Referring to FIG. 3B in a general overview, FIG. 3B depicts an implementation of a method 350 for pausing a URL request to access a domain. In step 360, a monitor library detects an action of a user with respect to an email to access a domain that is not identified as trusted. In step 362, responsive to detecting the user action, the monitor library pauses the user's URL request to access the domain. In Step 364, the monitor library notifies the user console of the user's URL access request. In Step 366, the monitor library receives user input from the user console, and in Step 368, responsive to receiving the user input, the monitor library either unpauses the URL request or discards it.

Figure 3C:
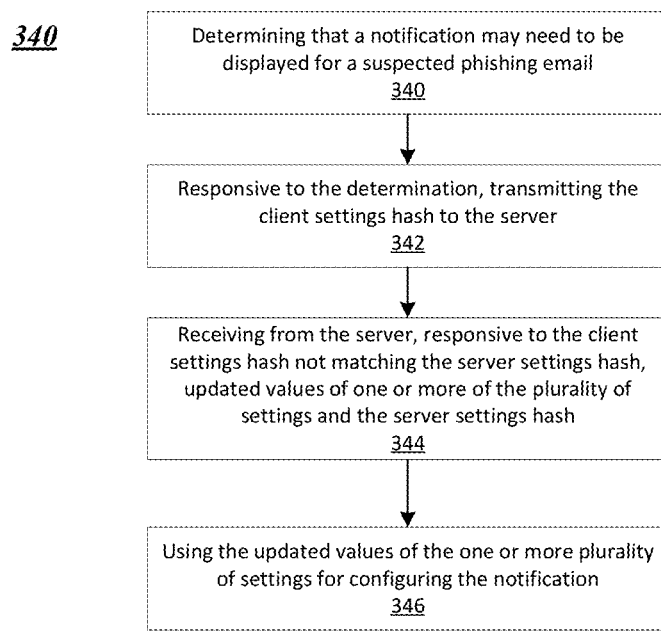
FIG. 3C depicts an implementation of a method for providing a notification to a user to confirm whether to review or take an action associated with an untrusted email using updated values of one or more of a plurality of settings.

Referring to FIG. 3C in a general overview, FIG. 3C depicts a method for updating settings of a notification to be displayed on a client. The method beings with establishing on a client device, an agent, the agent configured to display one or more notifications on the client device to identify that an email is a suspected phishing email, the one or more notifications configurable via a plurality of settings maintained by a server with a server setting hash. In step 340, the agent determines that a notification may need to be displayed for a suspected email. In some embodiments, the email may contain a URL that the client is unable to classify as a known safe URL. In step 342, responsive to this determination, the agent transmits the client settings hash to the server along with the query about the unknown URL. In step 344, the agent receives from the server, responsive to the client setting hash not matching the server settings hash, updated values of one or more of the plurality of settings and the server settings hash. In some embodiments, the agent stores the updates values of the settings and the server settings hash in memory on the client. In step 346, the agent configures the notification to the user using the updated values of the one or more plurality of settings.

Figure 3D:
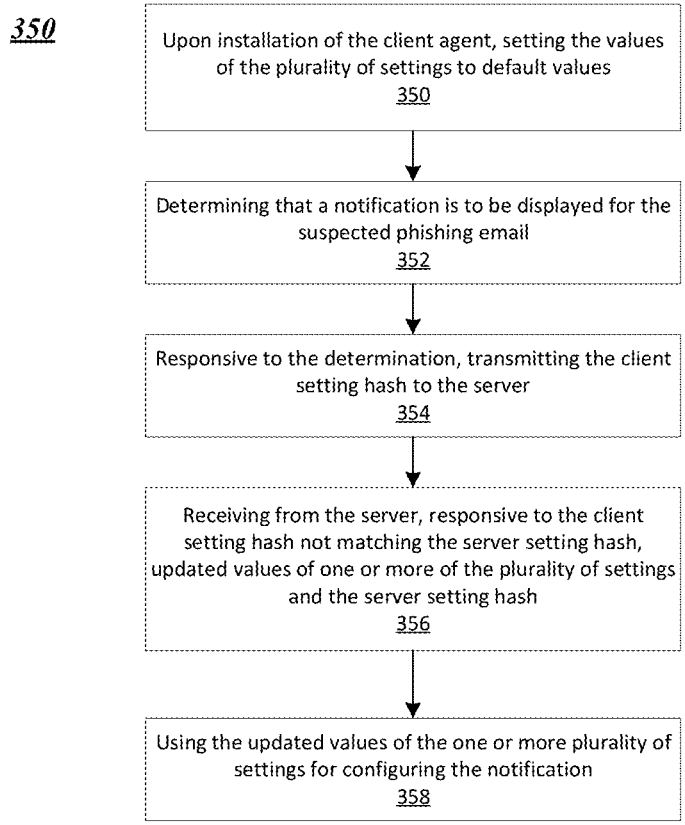
FIG. 3D depicts an implementation of a method for providing a notification to a user to confirm whether to review or take an action associated with an untrusted email using updated values of one or more of a plurality of setting comprising calculating a client setting hash by concatenating values of a plurality of settings stored on the client device into a string and applying a hash function to the string.

Referring to FIG. 3D in a general overview, FIG. 3D depicts a method for updating settings of a notification to be displayed on a client upon installation of the client. The method beings with establishing on a client device, an agent, the agent configured to display one or more notifications on the client device to identify that an email is a suspected phishing email, the one or more notifications configurable via a plurality of settings maintained by a server with a server setting hash. In step 350, upon installation of the client agent, the agent sets the values of the plurality of settings to default values. In step 352 the agent determines that a notification may need to be displayed for a suspected email. In some embodiments, the email may contain a URL that the client is unable to classify as a known safe URL. In step 354, responsive to this determination, the agent transmits the client settings hash to the server along with the query about the unknown URL. In step 356, the agent receives from the server, responsive to the client setting hash not matching the server settings hash, updated values of one or more of the plurality of settings and the server settings hash. In some embodiments, the agent stores the updates values of the settings and the server settings hash in memory on the client. In step 358, the agent configures the notification to the user using the updated values of the one or more plurality of settings.

Figure 3E:
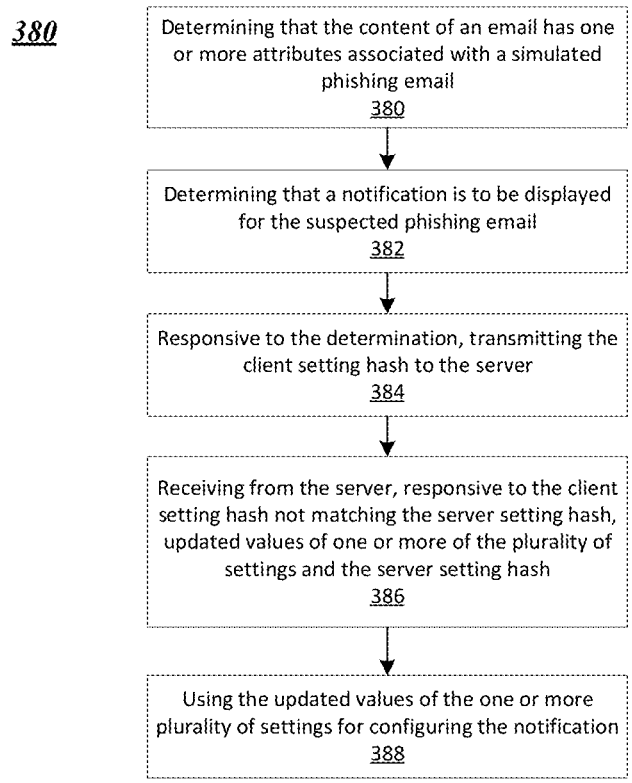
FIG. 3E depicts an implementation of a method for providing a notification to a user to confirm whether to review or take an action associated with an untrusted email using updated values of one or more of a plurality of setting comprising determining that the content of an email has one or more attributes associated with a simulated phishing email.

Referring to FIG. 3E in a general overview, FIG. 3E depicts a method for updating settings of a notification to be displayed on a client. The method beings with establishing on a client device, an agent, the agent configured to display one or more notifications on the client device to identify that an email is a suspected phishing email, the one or more notifications configurable via a plurality of settings maintained by a server with a server setting hash. In step 380, the agent determines that the content of an email has one or more attributes associated with a simulated phishing email. In step 382, the agent determines that a notification may need to be displayed for a suspected email. In some embodiments, the email may contain a URL that the client is unable to classify as a known safe URL. In step 384, responsive to this determination, the agent transmits the client settings hash to the server along with the query about the unknown URL. In step 386, the agent receives from the server, responsive to the client setting hash not matching the server settings hash, updated values of one or more of the plurality of settings and the server settings hash. In some embodiments, the agent stores the updates values of the settings and the server settings hash in memory on the client. In step 388, the agent configures the notification to the user using the updated values of the one or more plurality of settings.

Figure 3F:
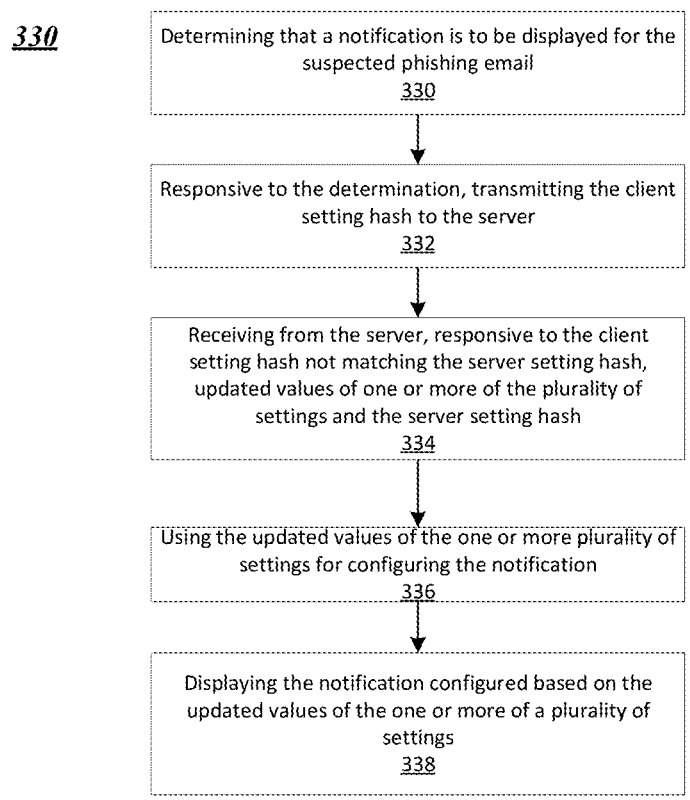
FIG. 3F depicts an implementation of a method for providing a notification to a user to confirm whether to review or take an action associated with an untrusted email using updated values of one or more of a plurality of setting comprising displaying the notification configured based on the updated values of the one or more of a plurality of settings.

Referring to FIG. 3F in a general overview, FIG. 3F depicts a method for updating settings of a notification to be displayed on a client and for displaying the notification to the user. The method beings with establishing on a client device, an agent, the agent configured to display one or more notifications on the client device to identify that an email is a suspected phishing email, the one or more notifications configurable via a plurality of settings maintained by a server with a server setting hash. In step 330, the agent determines that a notification may need to be displayed for a suspected email. In some embodiments, the email may contain a URL that the client is unable to classify as a known safe URL. In step 332, responsive to this determination, the agent transmits the client settings hash to the server along with the query about the unknown URL. In step 334, the agent receives from the server, responsive to the client setting hash not matching the server settings hash, updated values of one or more of the plurality of settings and the server settings hash. In some embodiments, the agent stores the updates values of the settings and the server settings hash in memory on the client. In step 336, the agent configures the notification to the user using the updated values of the one or more plurality of settings. In step 338, the agent displays the notification configured based on the updated values of the one or more of a plurality of settings.

Figure 4A:
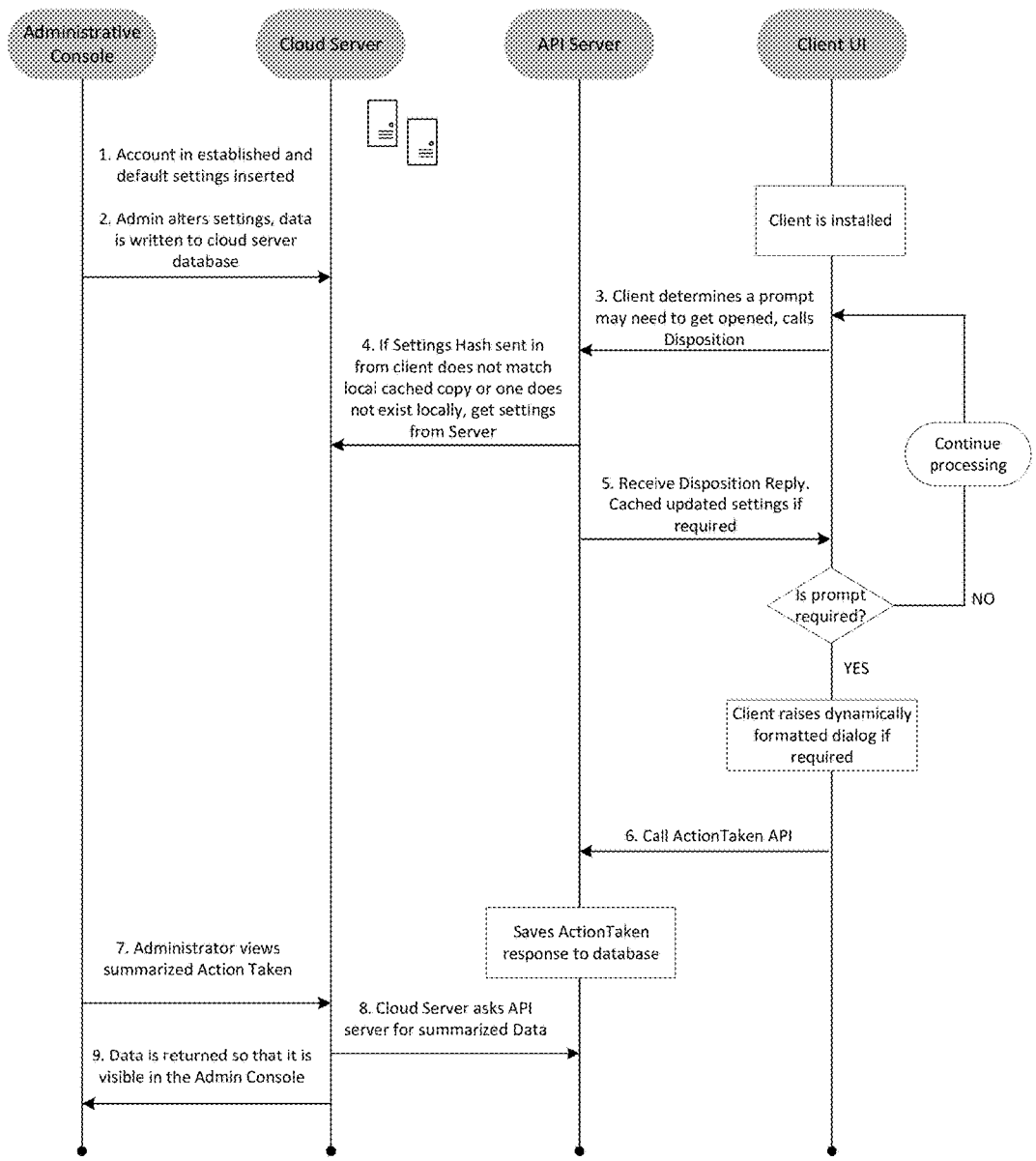
FIG. 4A depicts a detailed flow chart illustrating an example implementation of how configurable notifications work when the user console is first installed at a client.

Referring to FIG. 4A, the information flow diagram shows how configurable notifications work in conjunction with the installation in a program. In step 1, the client account is established, and default settings are inserted into the account settings data storage 234. In step 2, the company administrator alters the settings, writing data to the server using the user console 216. The client is then installed. Using the system and methods described in this application, the client determines that a notification prompt may need to be displayed to a user, because the system has identified a user interaction with an email that is potentially suspicious. The client makes a query using an API call to the server 106 including the settings hash from the settings hash storage 280. In step 4, if the client settings hash does not match the cached copy of the server settings hash, then the server retrieves the values for the one or more of the plurality of settings from the server. In step 5, the server then sends the query response to the client and includes the cached updated values for the one or more of the plurality of settings from the server in addition to the server settings hash. The new settings values and the new settings hash are stored in memory at the client. If needed, the client creased a notification prompt for the user using the updated stored settings. After raising the notification prompt, in step 6. The client invokes the ActionTaken API to the server. The server saves the ActionTaken response to the database. In step 7, at a later time the administrator can view the summarized actions taken. When the administrator requests this data, in step 8 the cloud server asks the API server for summarized data. In step 9, the data is returned and is visible to the company administrator in the user console 216.

Figure 4B:
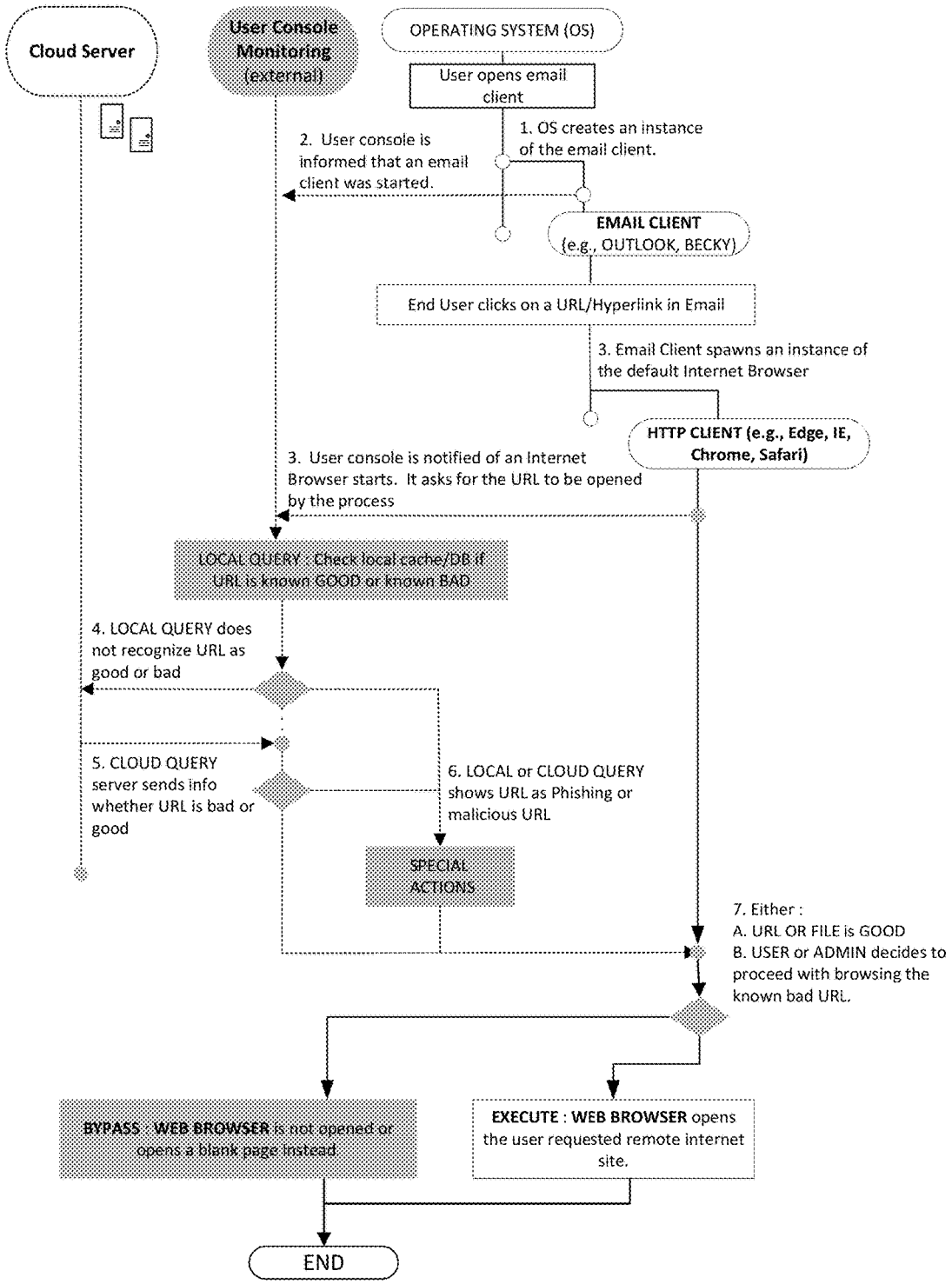
FIG. 4B depicts a detailed flow chart illustrating an example implementation of the system utilizing a user console to monitor processes of a messaging application (e.g., email client or browser based email client)

Referring to FIG. 4B, the information flow diagram shows a user console monitoring processes. In the user's operating system, the user opens a messaging application 270 (for example, an email client or browser-based email client). The user console 216 is equipped with an internal library, the core library 220. Via the core library 220 the user console 216 receives messages from the client driver 215 each time the operating system creates a new process for a messaging application 270. In some configurations, the user console 216 tracks if an instance of a default internet browser has been spawned, as would be the case if the user clicks on a URL or hyperlink in an email. The user console 216 detects the creation of this new process, and also knows that the HTTP client is a child of the messaging application. In other words, the user console 216 knows that the URL was launched by a message (for example, an email) through the action of the user clicking on a URL or hyperlink. This is called detection by inheritance. When the user console 216 is notified by the core library 220 that the HTTP client has started, the user console 216 queries the shared memory map 219 to learn the URL that is to be opened in the process and the HTTP client is put into a suspended state. The user console 216 then makes a local query to the shared memory map 219 and checks the trusted domains list and the untrusted domains list to see if it can find the URL that is to be opened by the HTTP client. If the local query does not recognize the URL in either the trusted domains list or the untrusted domains list, then the client service 214 uses an API to send a query to the server 106. The server 106 responds with information that is has on the URL, based on the server 106 trusted domains storage 230A and untrusted domains storage 232A. If the domain is unknown, the server returns this result to the client service 214.

In the example flow shown in FIG. 4A, without getting into the messaging application 270, the second chance system is able to detect that an HTTP client has been launched from a messaging application 270. FIG. 4A describes the process of the invention for operating systems that have a very restricted process context, such as IOS, BSD, Unix and Linux.

Figure 4C:
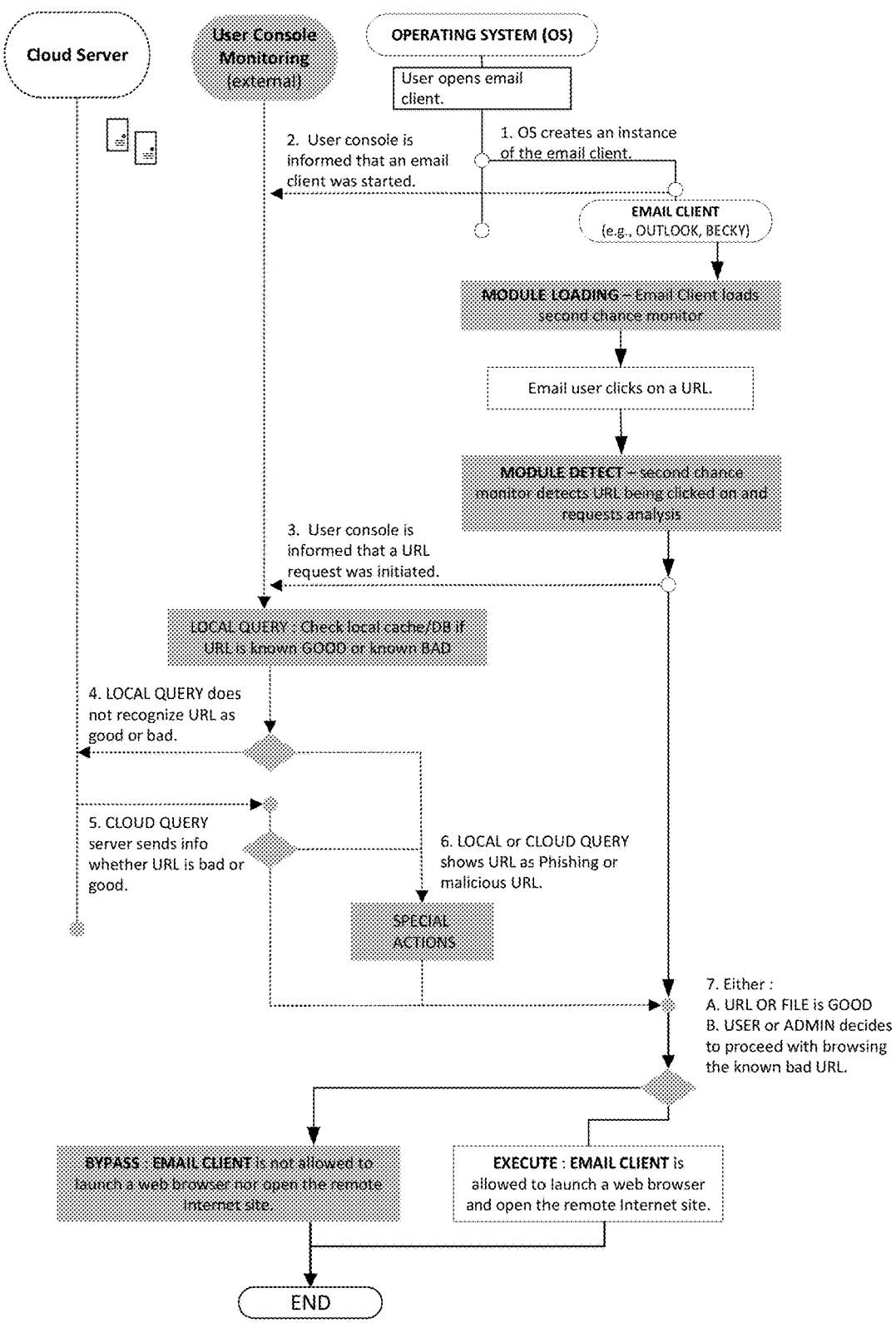
FIG. 4C depicts a detailed flow chart illustrating another example implementation of the system utilizing the user console to monitor processes of a messaging application (e.g., email client or browser based email client) and a monitor library that monitors processes within the messaging application.

Referring to FIG. 4C, the information flow diagram shows the user console 216 to monitor processes external to a messaging application 270 (e.g., email client or browser based email client) and a monitor library 224 that monitors processes within the messaging application 270. In some operating systems, it is possible that when a URL is clicked within a messaging application 270, it does not spawn a new process. In this case, the user console 216 would not detect the inheritance of the link, as there is no process that would be the parent of the parent-child relationship as described in FIG. 4A. When the user opens a messaging application 270, a process is started and the user console 216 detects this process. Because the process is a messaging application, the user console knows that this is a program that it needs to monitor. At this point, the client service 216 spawns an injector process 222 to injects some of its own code (the monitor library 224) into the messaging application 270 (e.g. the email client or browser-based email client) so that its behavior can be monitored. This is the primary distinction from FIG. 4A, where no code is injected. Many operating systems (e.g. Linux) do not allow for the injecting of code into a messaging client, however versions of the Windows operating system allow this. This injected code monitors the URLs that the user clicks. In this way, the system is able to detect the URL and the opening of the browser is suspended while the system makes a query to determine if the URL is known trusted or known untrusted or unknown.

The system also works the same for message attachments that may include a link, for example Microsoft Word or Adobe PDF attachments. In this case, the user console 216 spawns an injector process 222 to inject code into the executing application 212 so that if there is a link in a Word document that was attached to a message such as an email, or a link in a pdf document that was attached to a message such as an email, the system will monitor the users' actions with respect to that link. Specifically, in the case of Word, when the Word application is opened, Microsoft creates a server-type process that has child Word document processes living off it. The user console 216 monitors the spawning of a child Word document process that is related to the messaging application process and then directs an injector process 222 to inject a monitor library 224 into that Word process. This in effect monitors links in all Word documents that are opened until all Word documents are closed and the server-type original process is also closed.

For FIGS. 4B-4C, special actions take place on determining the result of the query. Several special actions are available to the user console 216 at this point. The user may be informed of danger. The user may choose whether to proceed or not. The user administrator may be informed of danger. The remote administrator may block the HTTP client from opening the URL or the file. The user may be reminded of anti-phishing training that they have received. The HTTP client may be traversed to different URL in order to execute user training at that time. The client's computer may be locked until they complete a training module. The HTTP client may be allowed to continue to the URL whether the URL is an untrusted domain or a trusted domain. The HTTP client may be terminated. The HTTP client may be traversed to a different landing page or to a blank page. The system may track the user's action in response to the prompt given in order to perform further analysis.

Figure 4D:
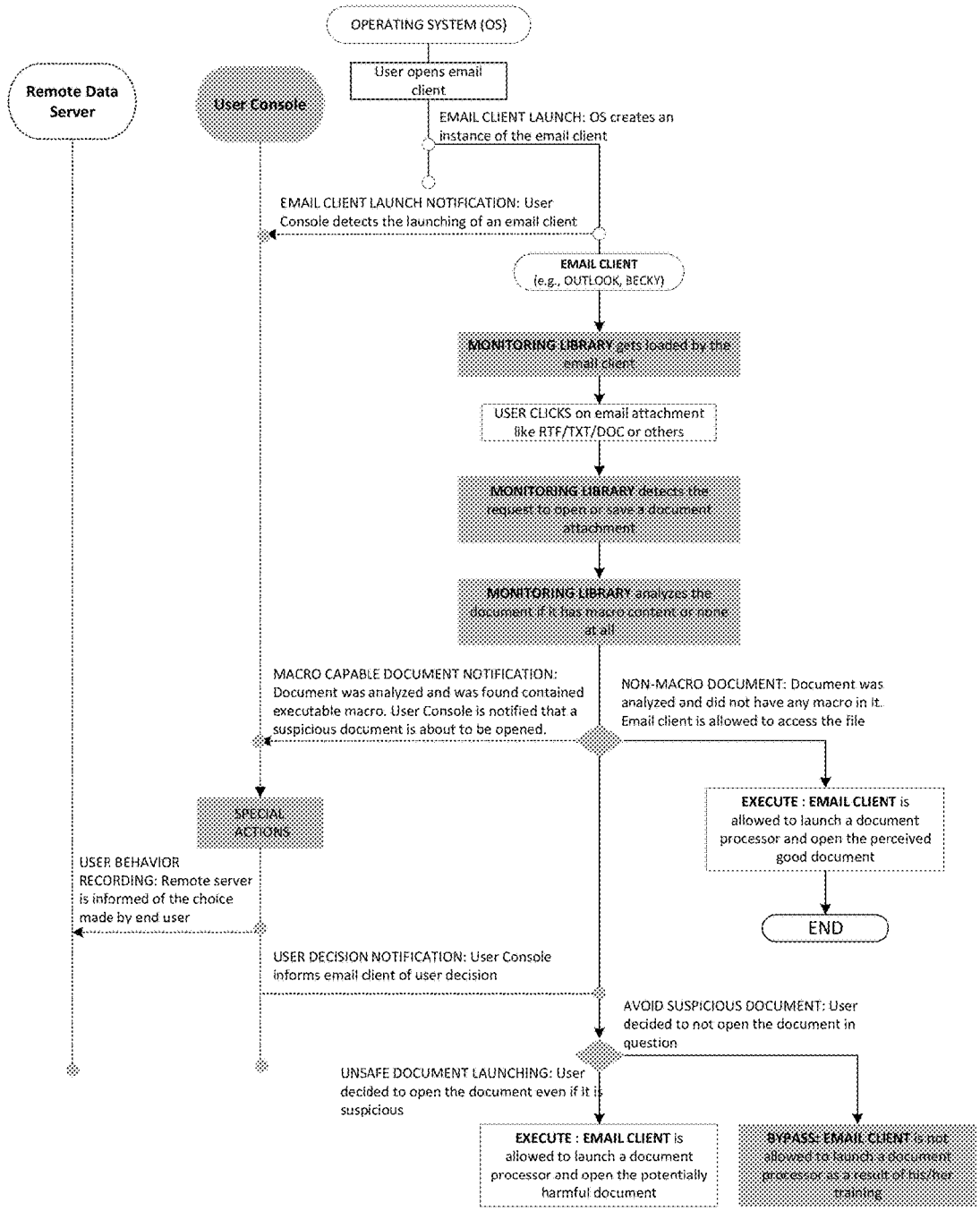
FIG. 4D depicts a detailed flow chart illustrating another example implementation of the system utilizing the user console for detecting and prompting users about documents embedded with executable code like macros.

FIG. 4D shows an information flow for detecting and prompting users about documents embedded with executable code like macros. Without opening the file, a user cannot determine if an email attachment is embedded with executable code like macros. Some macros are executed as soon as the attachment is opened by the user. Other are not auto-activated but have content that can lure users to enable macros in applications like Microsoft Word and Microsoft Excel. In FIG. 4C, the information flow diagram shows the user console 216 to monitor processes external to a messaging application 270 (e.g., email client or browser-based email client) and a monitor library 224 that monitors processes within the messaging application 270. When the user opens a messaging application 270, a process is started and the user console 216 detects this process. Because the process is a messaging application, the user console knows that this is a program that it needs to monitor. At this point, the client service 216 spawns an injector process 222 to injects some of its own code (the monitor library 224) into the messaging application 270 (e.g. the email client or browser-based email client) so that its behavior can be monitored. When the user clicks on an email attachment, such as RTF, TXT, DOC, XLS files and others, the monitor library 224 detects the request to open or save a document attachment. The monitor library 224 analyzes the document to determine if it has macros content in it. If the document is analyzed and found not to have any executable macro in it, then the messaging application 270 is allowed access to the file. If the attachment was found to contain an executable macro, the monitor library 224 notifies the user console 216 that a suspicious document is about to be opened. The user console 216 may report the user behavior to the server 106, and the user prompts the user for a decision. The user console 216 informs the monitor library 224 of the user decision and the monitor library 224 subsequently takes an action responsive to the user decision. In one embodiment, the email client or browser-based email client is allowed to open the potentially harmful document. In one embodiment, the email client or browser-based email client is not allowed to open the potentially harmful document. Although FIG. 4C illustrates the system operating in response to an email client or browser-based email client, it will be obvious to those skilled in the art that the email client or browser-based email client is not necessary, and any other application may be used to prompt users just before they open macro-capable documents.

Figure 4E:
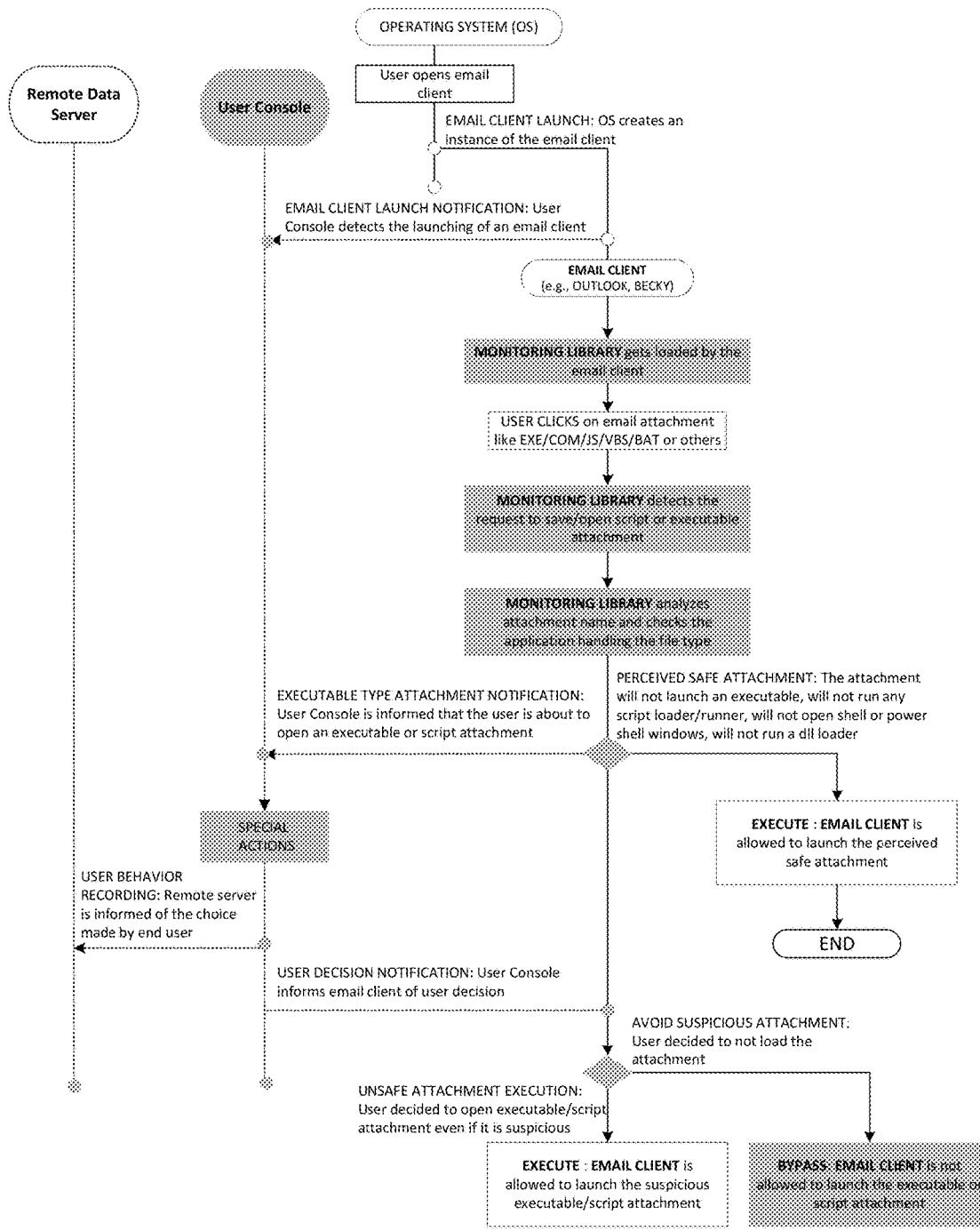
FIG. 4E depicts a detailed flow chart illustrating another example implementation of the system utilizing the user console for detecting and prompting users about executable binaries or script email attachments.

FIG. 4E shows an information flow for detecting and prompting users about executable binaries or script email attachments. Often, malicious executable email attachments use well known icons like "pdf", "doc", or "jpg" to lure users to open them. They also use dubious names like "sample.pdf.exe" to make them look like legitimate pdf files when the operating system does not display the file extension. In this case, "sample.pdf.exe" is displayed as "sample.pdf". Other email attachments are shell scripts or java scripts that usually end up downloading more executable code to harm or gather data on the user. In FIG. 4E, the information flow diagram shows the user console 216 to monitor processes external to a messaging application 270 (e.g., email client or browser-based email client) and a monitor library 224 that monitors processes within the messaging application 270. When the user opens a messaging application 270, a process is started and the user console 216 detects this process. Because the process is a messaging application, the user console knows that this is a program that it needs to monitor. At this point, the client service 216 spawns an injector process 222 to injects some of its own code (the monitor library 224) into the messaging application 270 (e.g. the email client or browser-based email client) so that its behavior can be monitored. When the user clicks on an email attachment, such as EXE, COM, JS, VBS, BAT and others, the monitor library 224 detects the request to open or save a script or executable attachment. The monitor library 224 analyzes the attachment name and checks the application handling the file type. If the attachment is analyzed and found that the attachment will not launch and executable, the attachment will not run any script loader or running, the attachment will not open shell or power shell windows, and the attachment will not run a dll loader, then the messaging application 270 is allowed access to the file. If the attachment was found to contain an executable or script attachment, the monitor library 224 notifies the user console 216 that a suspicious document is about to be opened. The user console 216 may report the user behavior to the server 106, and the user prompts the user for a decision. The user console 216 informs the monitor library 224 of the user decision and the monitor library 224 subsequently takes an action responsive to the user decision. In one embodiment, the email client or browser-based email client is allowed to launch the suspicious executable/script attachment. In one embodiment, the email client or browser-based email client is not allowed to launch the suspicious executable/script attachment. Although FIG. 4E illustrates the system operating in response to an email client or browser-based email client, it will be obvious to those skilled in the art that the email client or browser-based email client is not necessary, and any other application may be used to prompt users just before they open macro-capable documents.

Figure 5A:
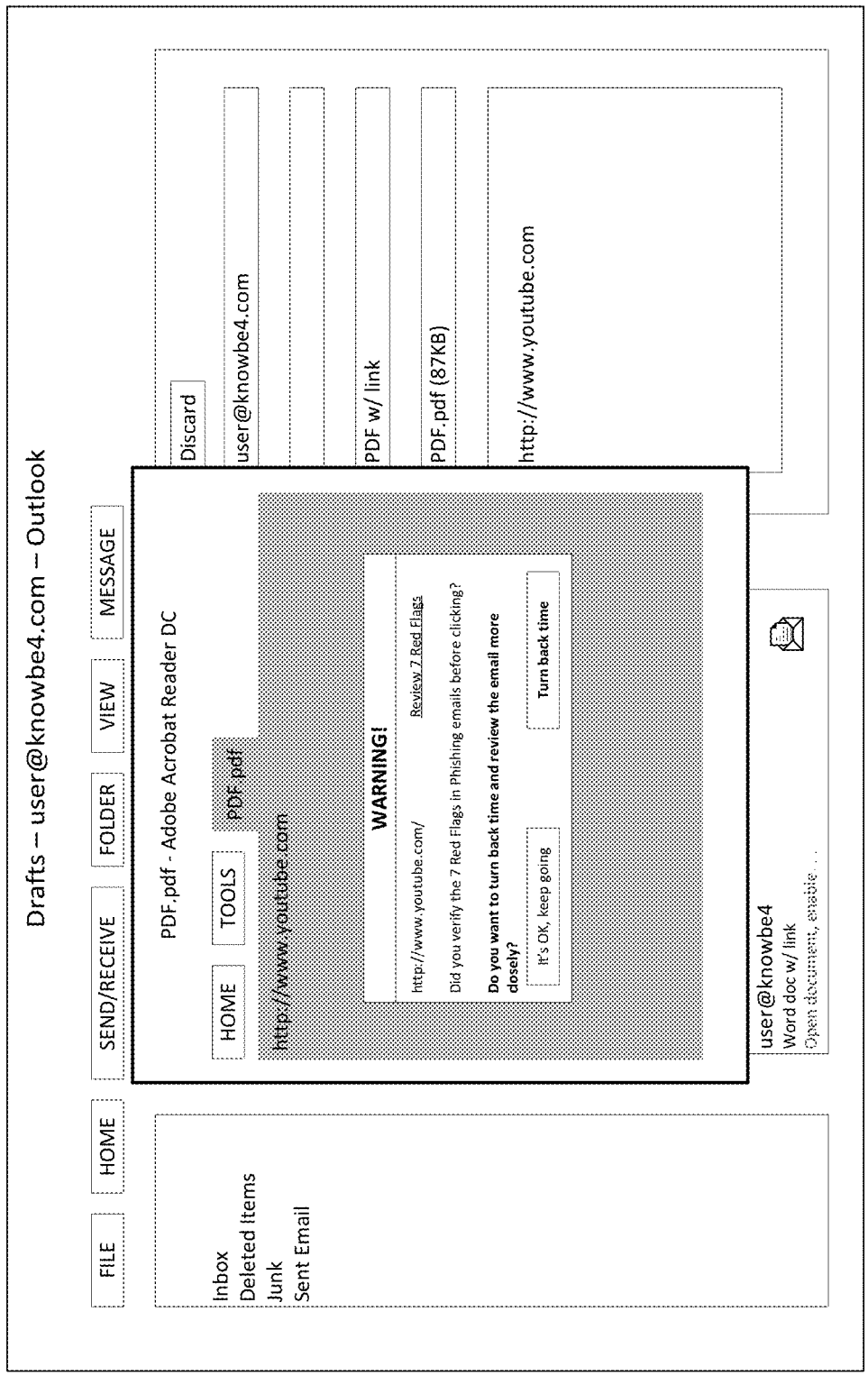
FIGS. 5A-5B depict example implementations of the system providing notifications when a user opens untrusted domains in attached pdf files of untrusted emails.

FIG. 5A illustrates a screen shot of the system providing notifications when a user opens untrusted domains in attached pdf files of untrusted emails. FIG. 5A shows how the second chance system can appear to users via a user interface. The second chance system tracks when user opens an attachment (e.g., pdf) in an email. The system tracks opening of the attachment and monitors the executing application (e.g., Adobe Acrobat Reader) regarding future actions by the user with respect to this pdf. In this pdf document, there is a link that the system monitors in case the user clicks on the link. The system monitors the executing application and intercepts the user clicking in the pdf document. The system pops up a message (as shown in FIG. 5A). This example shows two buttons (e.g., "Yes" or "No"). The present solution allows for the configuration of the notification shown.

Figure 5B:
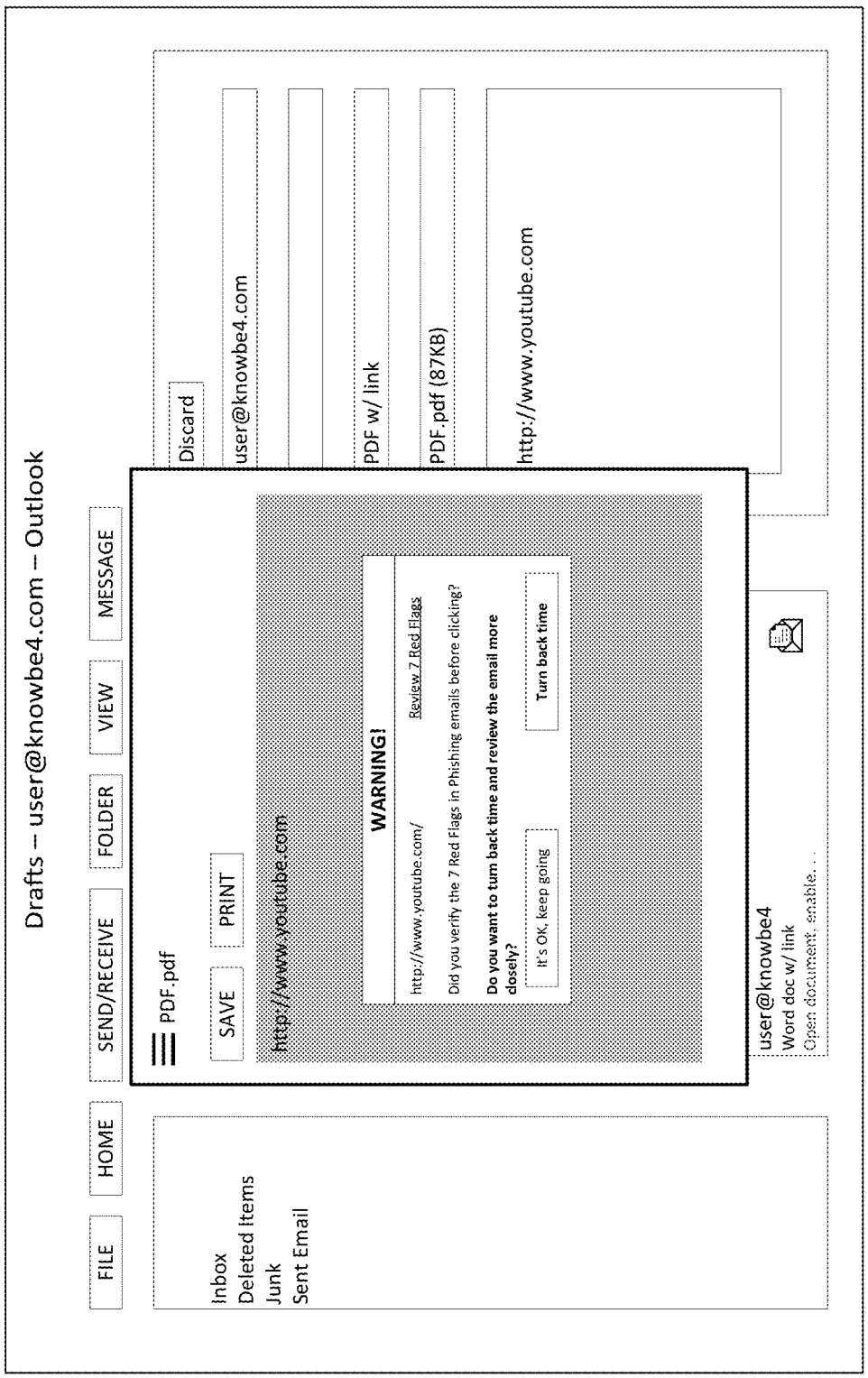

FIG. 5B illustrates another screen shot of the system providing notifications when the user opens untrusted domains in attached pdf files of untrusted emails. FIG. 5B shows another pdf reader. FIG. 5B is the same as FIG. 5A but shows use of a different executing application (e.g., Sumatra) to show that the system can work with other applications. As appreciated by one of skill in the art, other applications can be monitored such as Foxit.

Figure 5C:
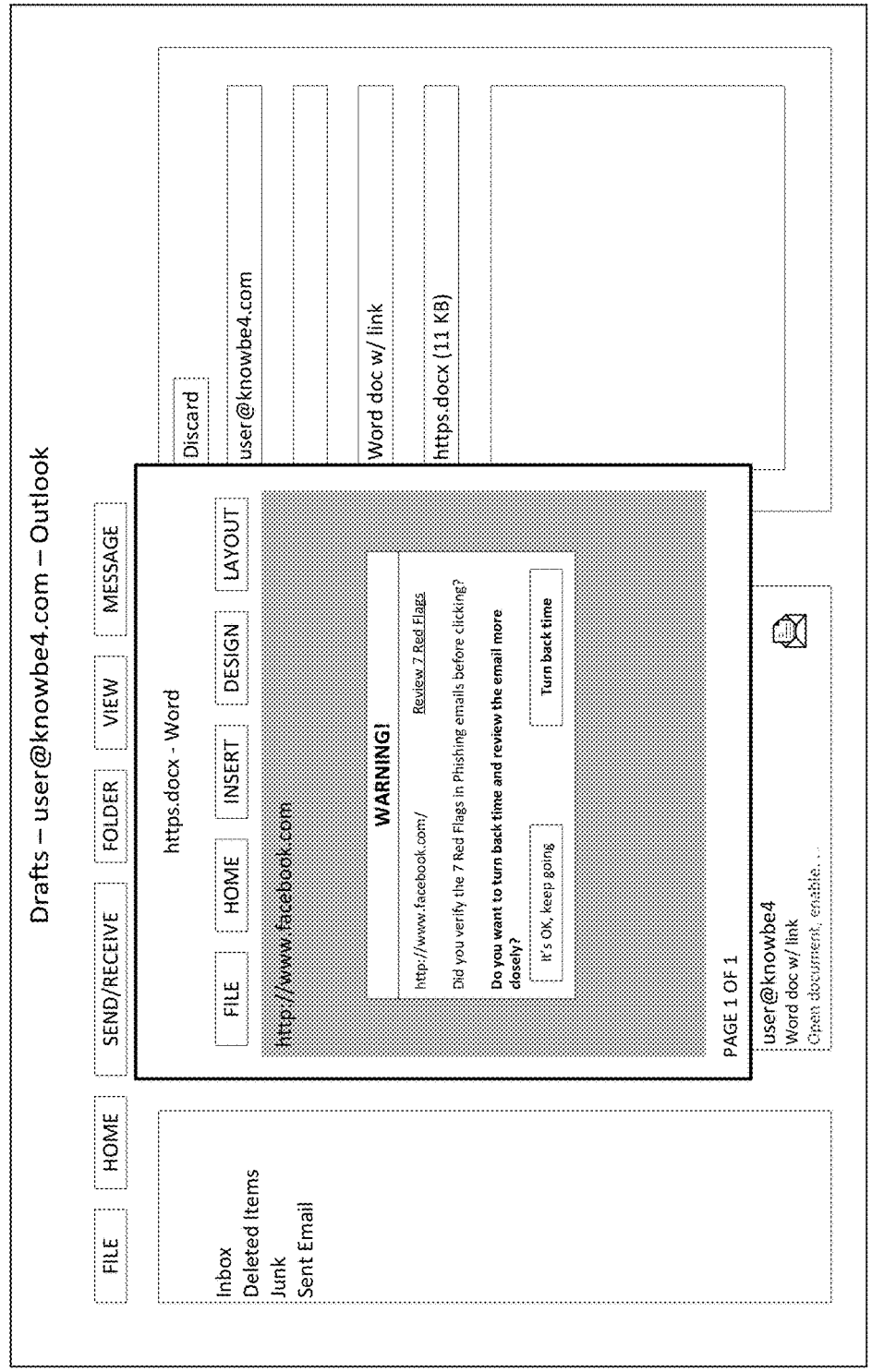
FIG. 5C depicts another example implementation of the system providing a notification when a user opens an untrusted domain in an attached word document file of an untrusted email.

FIG. 5C illustrates another screen shot providing a notification when a user opens an untrusted domain in an attached word document file of an untrusted email. FIG. 5C is basically the same thing as FIGS. 5A-5B but uses a word document (e.g., docx) as the attachment to the email instead of the pdf file. When the user opens the word document and then clicks on link in word document, the second chance system intercepts the action of going to the website. The system is able to intercept this action by monitoring processes of Microsoft Word in this example.

Figure 5D:
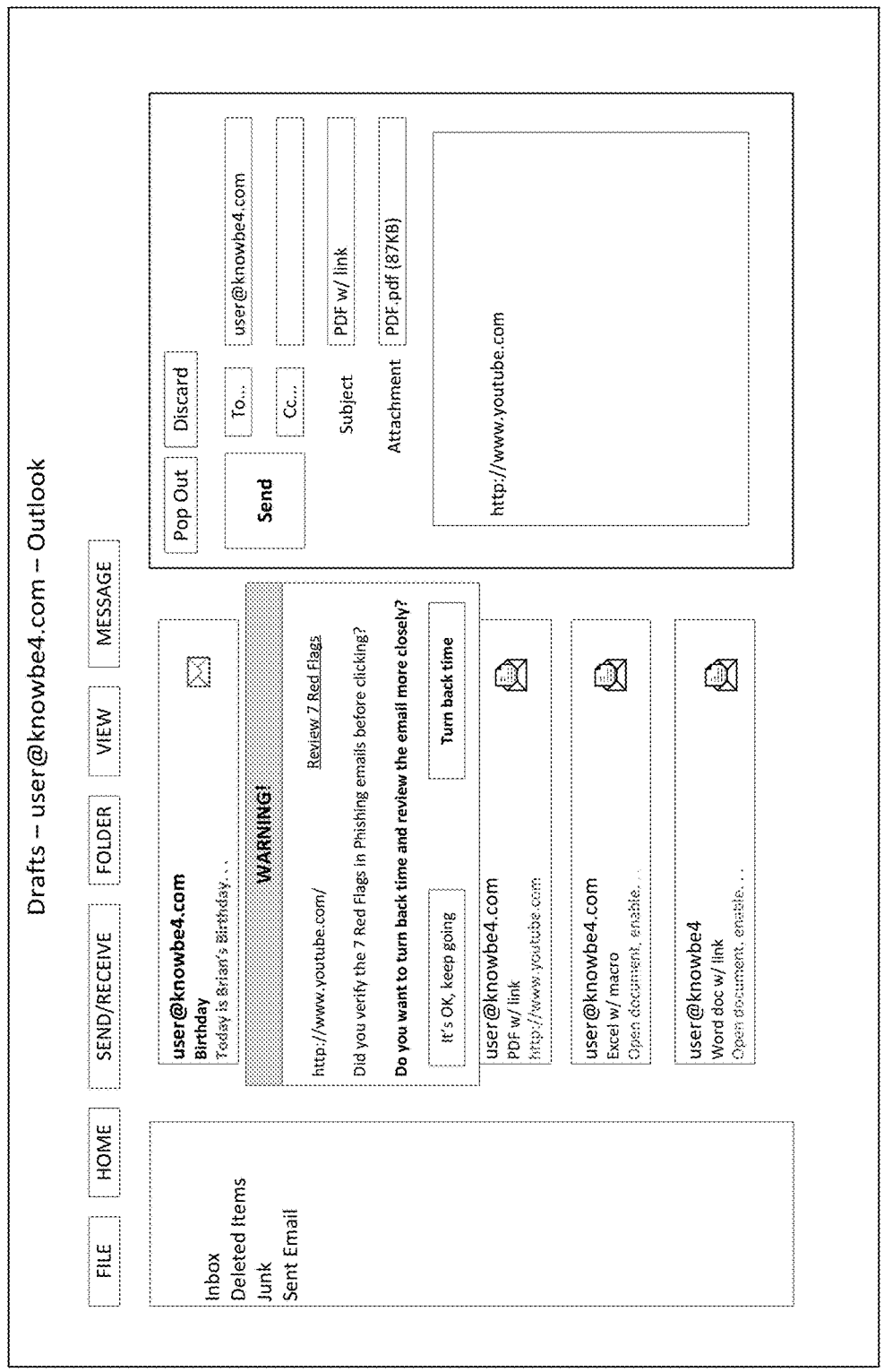
FIG. 5D depicts another example implementation of the system providing a notification when a user opens an untrusted domain in an untrusted email.

FIG. 5D illustrates another screen shot providing a notification when a user opens an untrusted domain in an untrusted email. FIG. 5D shows a simple link in an email. In this example, the system is monitoring Outlook in order to intercept the user's actions with respect to opening the link. FIG. 5D also shows how training can be provided to the user in the pop up message, in this case offering a chance for the user to review their training related to phishing emails before making a decision.

Figure 5E:
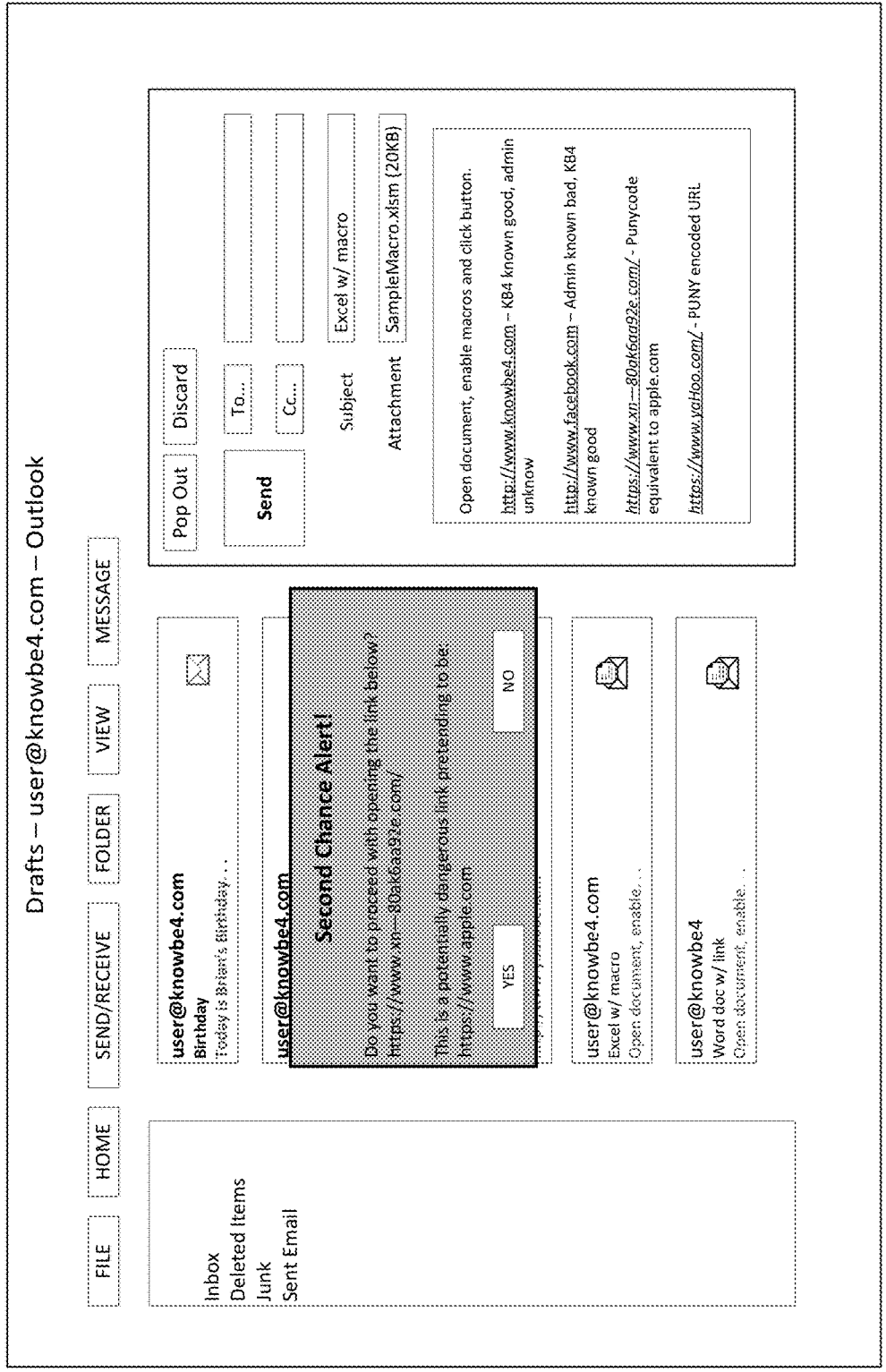
FIG. 5E depicts another example implementation of the system providing a notification when a user opens an untrusted domain in an untrusted email.
Figure 5F:
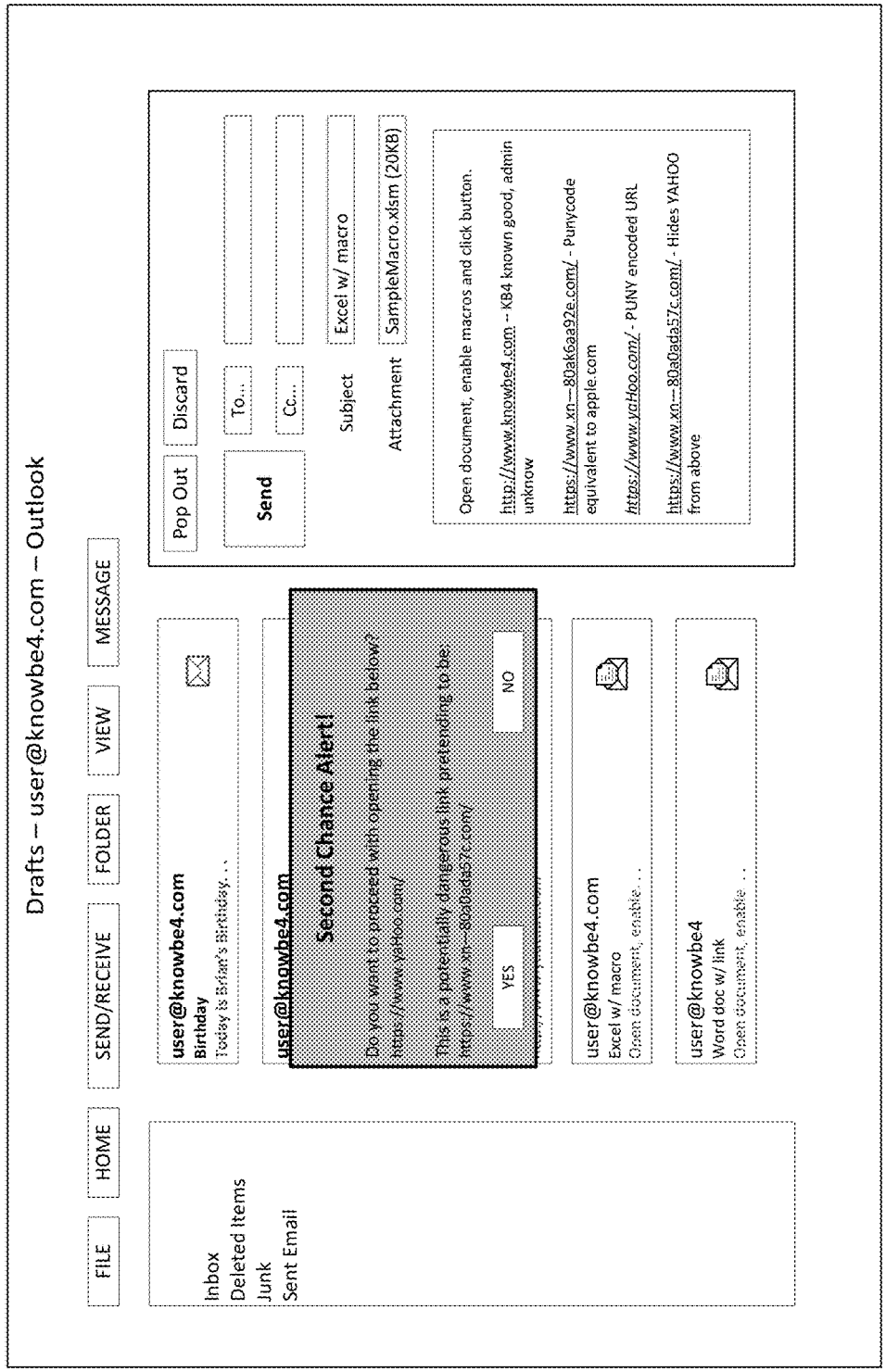
FIG. 5F depicts another example implementation of the system providing a notification when a user opens an untrusted domain in an untrusted email.

FIG. 5E and FIG. 5F illustrate other screen shots showing the use of the uniform resource location translator 221, in this case showing Punycode URLs which are pretending to be familiar URLs, such as www.apple.com and www.yahoo.com.

Figure 6A:
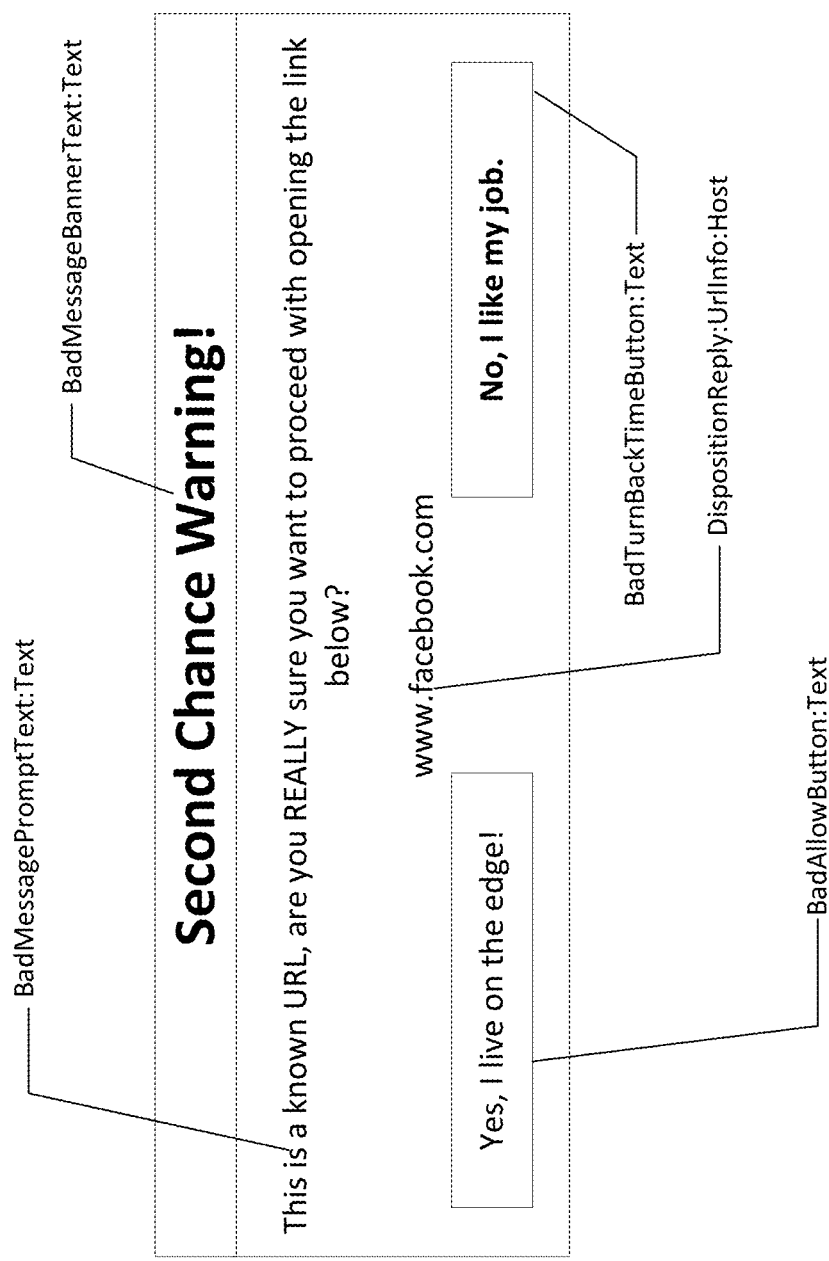
FIG. 6A depicts an example implementation of the system providing a notification when a user opens an untrusted domain in an untrusted email, showing examples of the configurable fields in the notification.

FIG. 6A illustrates a known bad URL notification or user prompt. Shown in the figure are the account data settings that are customized, including BadMessagePromptText, BadMessageBannerText, BadAllowButtonText, DispositionReply:UrlInfo, and BadTurnBackTimeButton.

Figure 6B:
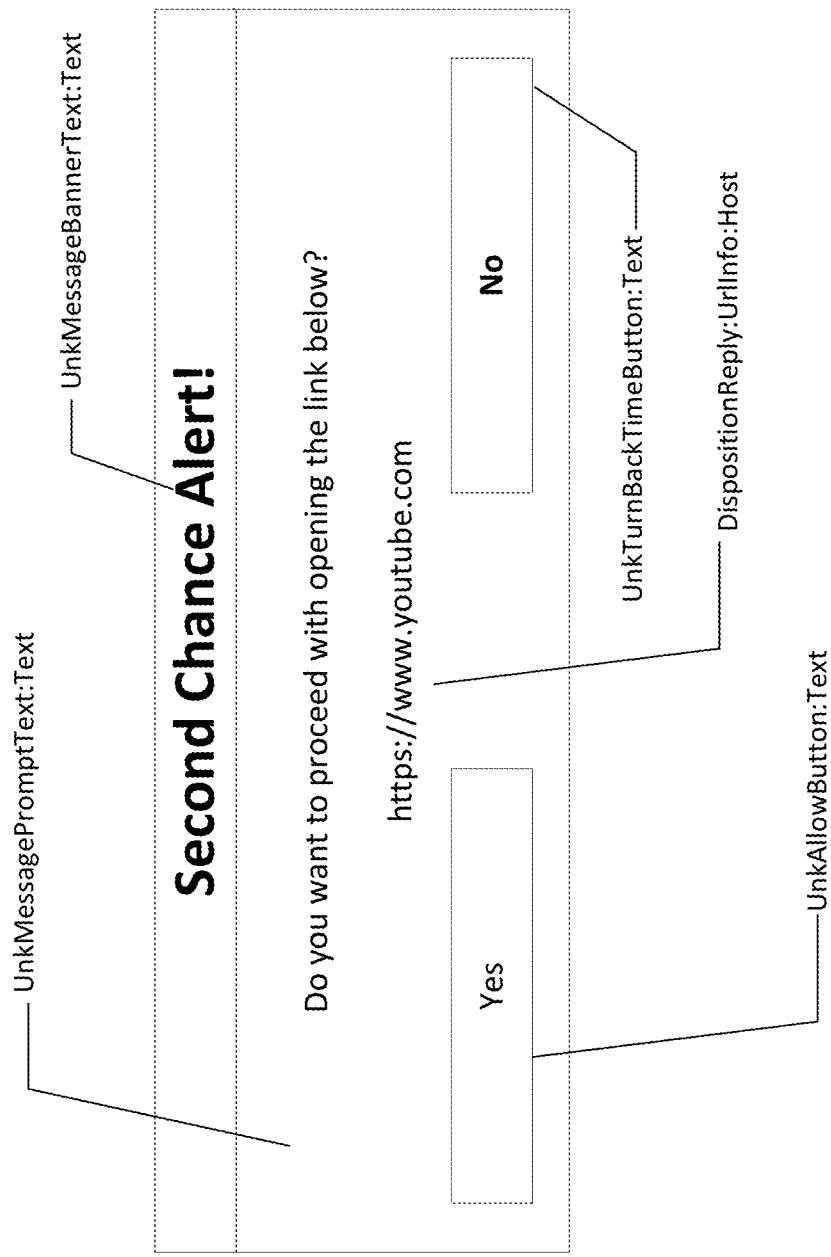
FIG. 6B depicts another example implementation of the system providing a notification when a user opens an untrusted domain in an untrusted email, showing examples of the configurable fields in the notification.

FIG. 6B illustrates an unknown URL notification or user prompt. Shown in the figure are the account data settings that are customized, including UnkMessagePromptText, UnkMessageBannerText, UnkAllowButtonText, DispositionReply:UrlInfo, and UnkTurnBackTimeButton.

Figure 6C:
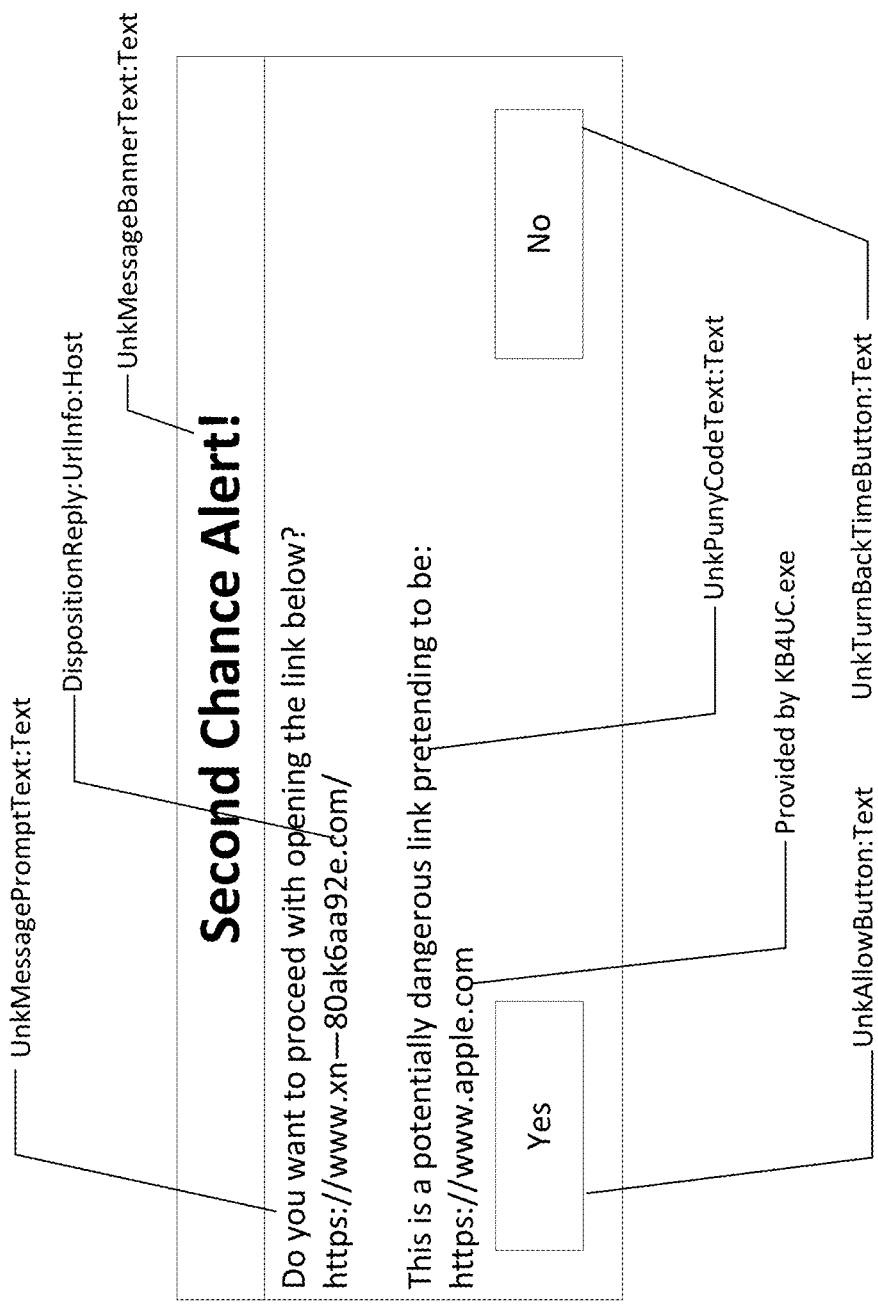
FIG. 6C depicts another example implementation of the system providing a notification when a user opens an untrusted domain in an untrusted email, showing examples of the configurable fields in the notification.

FIG. 6C illustrates a Puny Code notification or user prompt. Shown in the figure are the account data settings that are customized, including UnkMessagePromptText, DispositionReply:UrlInfo, UnkMessageBannerText, UnkAllowButton, instructional information provided by the security awareness system provider, UnkPunyCodeText, and UnkTurnBackTimeButton.

Figure 6D:
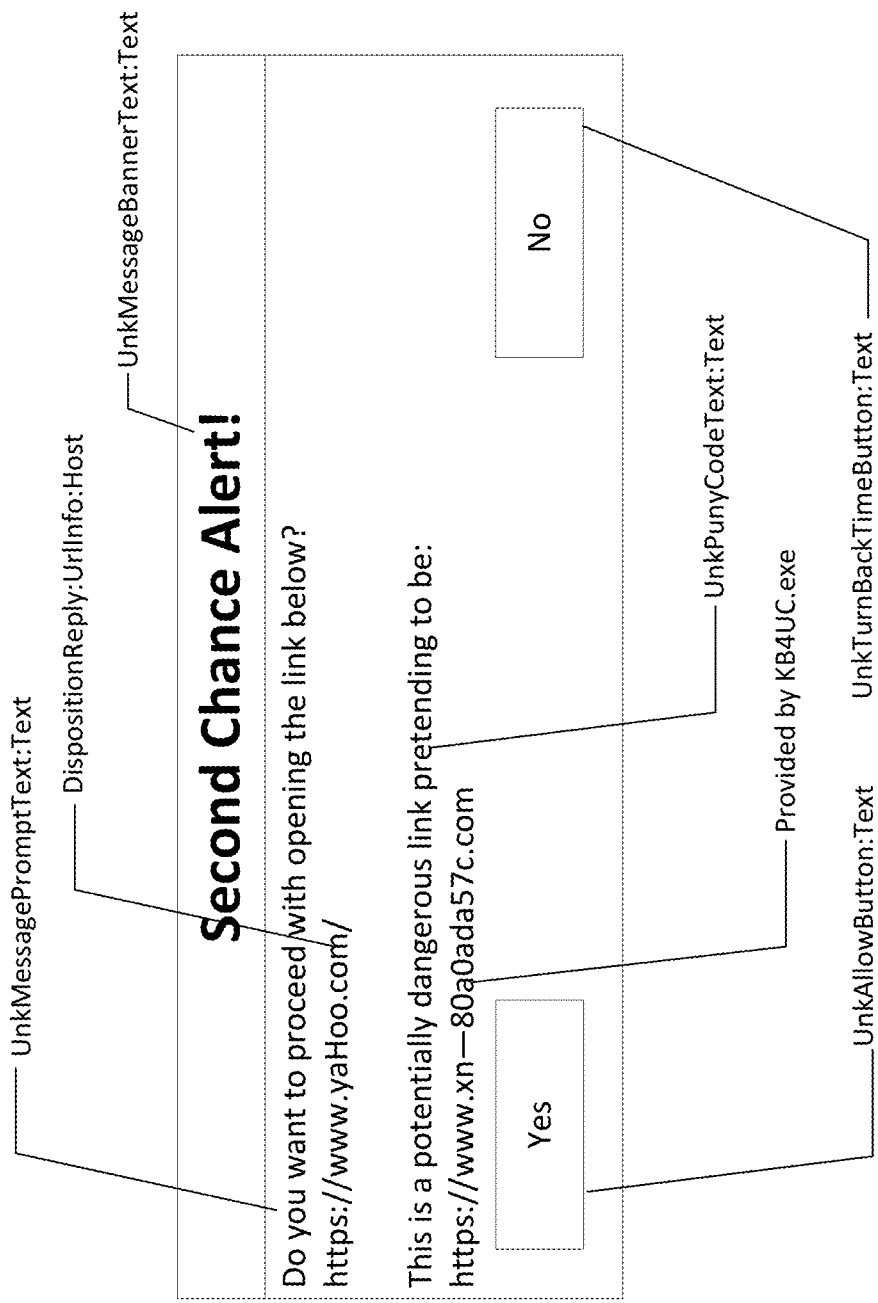
FIG. 6D depicts another example implementation of the system providing a notification when a user opens an untrusted domain in an untrusted email, showing examples of the configurable fields in the notification.

FIG. 6D illustrates a reverse Puny Code notification or user prompt. Shown in the figure are the account data settings that are customized, including UnkMessagePromptText, DispositionReply:UrlInfo, UnkMessageBannerText, UnkAllowButton, instructional information provided by the security awareness system provider, UnkReversePunyCodeText, and UnkTurnBackTimeButton.

As appreciated by one of skill in the art, the system may be implemented with other messaging applications 270 such as Gmail. The system is going to follow whatever browser the client is using to look at Gmail. For example, the system may need a browser plug-in to track Gmail. In some embodiments, an email client or browser-based email client is not needed at all, and the system can follow domains embedded directly in applications that are not associated with an email client or browser-based email client.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for providing a user interface to confirm whether to review or take an action associated with a domain that is identified as not trusted, the method comprising
   (a) monitoring, by a driver on a device, process execution of an application;
   (b) detecting, by the driver responsive to monitoring, that the application received an action of a user to access a domain that is identified as not trusted;
   (c) intercepting, by the driver, the action of the user prior to accessing the domain;
   (d) displaying, by a client service responsive to a signal from the driver while execution of the application is paused, a user interface to receive input from the user to confirm whether to take the action or to revert back to review the action; and
   (e) unpausing execution of the application based on the input.

2. The method of claim 1, wherein (e) further comprises receiving input via the user interface from the user confirming to take the intercepted action and responsive to the input, allowing the application to continue to process the intercepted action.

3. The method of claim 1, wherein (e) further comprises receiving input from the user to revert back to review the action and responsive to the input providing access to the application for the user to review a point in the application at which the user took the action.

4. The method of claim 1, wherein (a) further comprises identifying, by the driver, one or more processes initiated from the application.

5. The method of claim 4, further comprising associating the one or more processes with at least one of the application, the action taken by the user or the domain.

6. The method of claim 1, wherein (a) further comprises tracking, by the driver, actions of the user taken to open a file obtained from a phishing email.

7. The method of claim 1, wherein (b) further comprises detecting, by the driver, the action of the user to access the domain comprising a click by the user on a uniform resource locator provided via one of the application or a process associated with the application.

8. The method of claim 1, wherein the application is one of paused or unpaused by one of the driver or the client service.

9. The method of claim 1, further comprising receiving, by the driver, from a server a predetermined list of domains identified as one of trusted or not trusted.

10. The method of claim 1, further comprising obtaining, by the driver, from storage of the device a predetermined list of domains identified as one of trusted or not trusted by an administrator of the device.

11. The method of claim 1, wherein the application is an email application.

12. The method of claim 11, wherein the email application is one of web-based or browser based.

13. A system for providing a user interface to confirm whether to review or take an action associated with a domain that is identified as not trusted, the system comprising
    a driver executable on a processor of a device and configured to:
        monitor process execution of an application;
        detect responsive to monitoring, that the application received an action of a user to access a domain that is identified as not trusted;
        intercept the action of the user prior to accessing the domain;
    a client service executable on the processor of the device and configured to:
        display, responsive to a signal from the driver while execution of the application is paused, a user interface to receive input from the user to confirm whether to take the action or to revert back to review the action; and
        wherein the application is unpaused based on the input.

14. The system of claim 13, wherein the client service is further configured to receive input via the user interface from the user confirming to take the intercepted action and responsive to the input, allowing the application to continue to process the intercepted action.

15. The system of claim 13, wherein the client service is further configured to receive input from the user to revert back to review the action and responsive to the input providing access to the application for the user to review a point in the application at which the user took the action.

16. The system of claim 13, wherein the driver is further configured to identify one or more processes initiated from the application.

17. The system of claim 16, wherein the driver is further configured to associate the one or more processes with at least one of the application, the action taken by the user or the domain.

18. The system of claim 13, wherein the driver is further configured to track actions of the user taken to open a file obtained from a phishing email.

19. The system of claim 13, wherein the driver is further configured to detect the action of the user to access the domain comprising a click by the user on a uniform resource locator provided via one of the application or a process associated with the application.

20. The system of claim 13, wherein the application is one of paused or unpaused by one of the driver or the client service.

21. The system of claim 13, wherein the driver is further configured to receive from a server a predetermined list of domains identified as one of trusted or not trusted.

22. The system of claim 13, wherein the driver is further configured to obtain from storage of the device a predetermined list of domains identified as one of trusted or not trusted by an administrator of the device.

23. The system of claim 13, wherein the application is an email application.

24. The system of claim 23, wherein the email application is one of web-based or browser based.

* * * * *